Dec. 7, 1965  S. W. SMALL ETAL  3,221,637
APPARATUS FOR BREWING AND DISPENSING BEVERAGES
Original Filed July 14, 1961  16 Sheets-Sheet 1

INVENTORS
SOLLIE W. SMALL
DAVID HERMAN
BY
William R. Liberman
ATTORNEY

Dec. 7, 1965  S. W. SMALL ETAL  3,221,637
APPARATUS FOR BREWING AND DISPENSING BEVERAGES
Original Filed July 14, 1961  16 Sheets-Sheet 3

INVENTORS
SOLLIE W. SMALL
DAVID HERMAN
BY
William R. Liberman
ATTORNEY

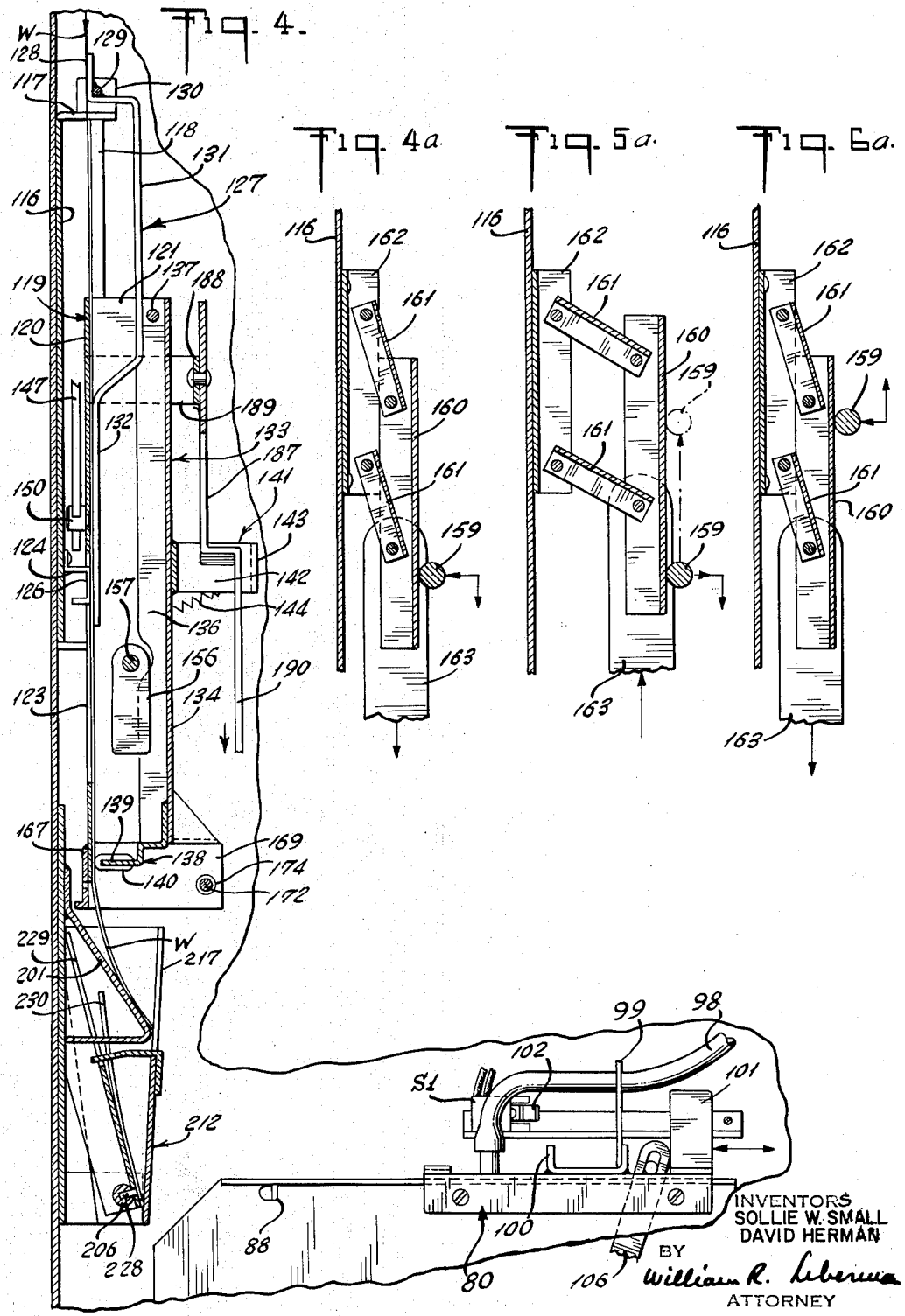

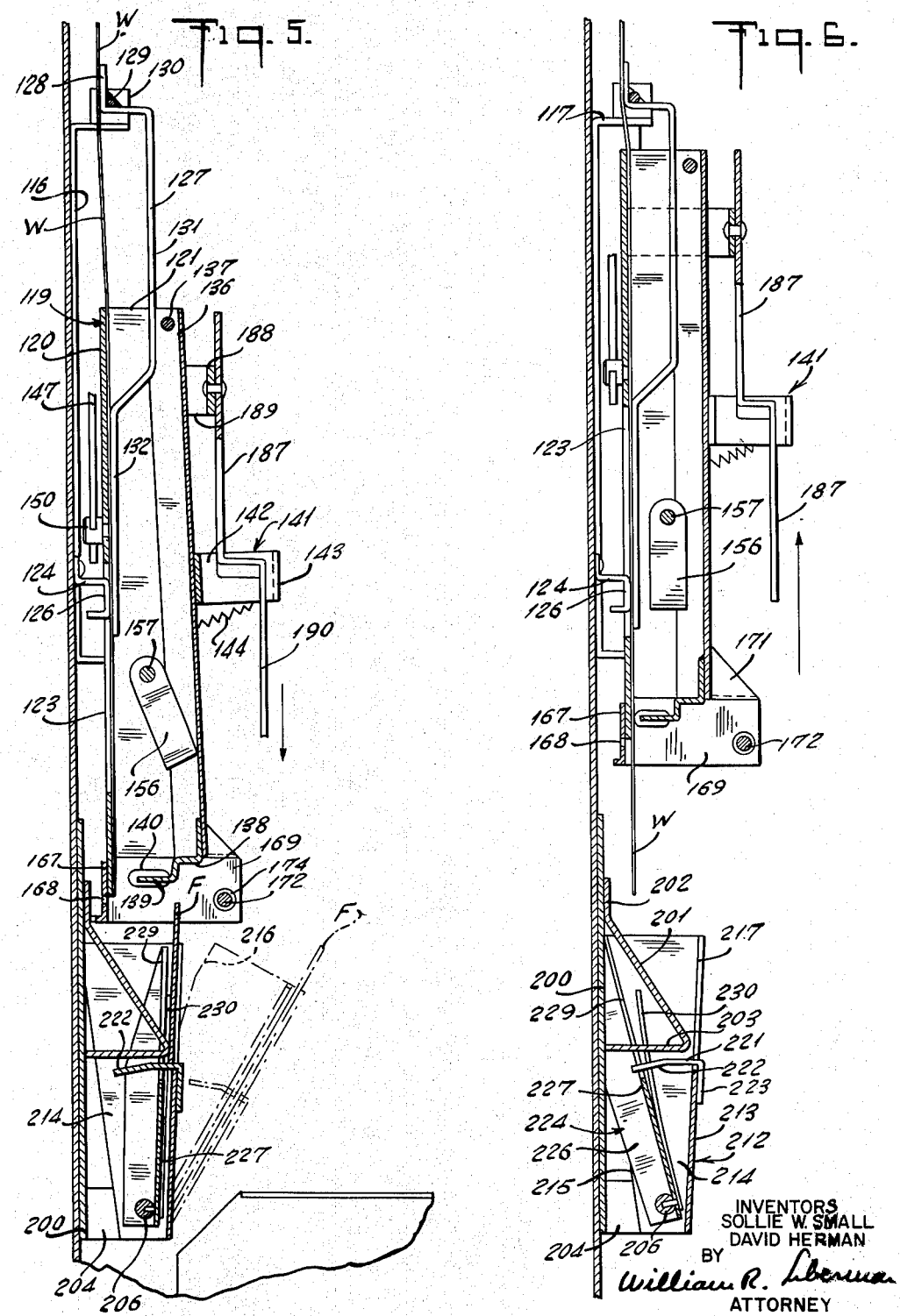

Dec. 7, 1965   S. W. SMALL ETAL   3,221,637
APPARATUS FOR BREWING AND DISPENSING BEVERAGES
Original Filed July 14, 1961   16 Sheets-Sheet 6
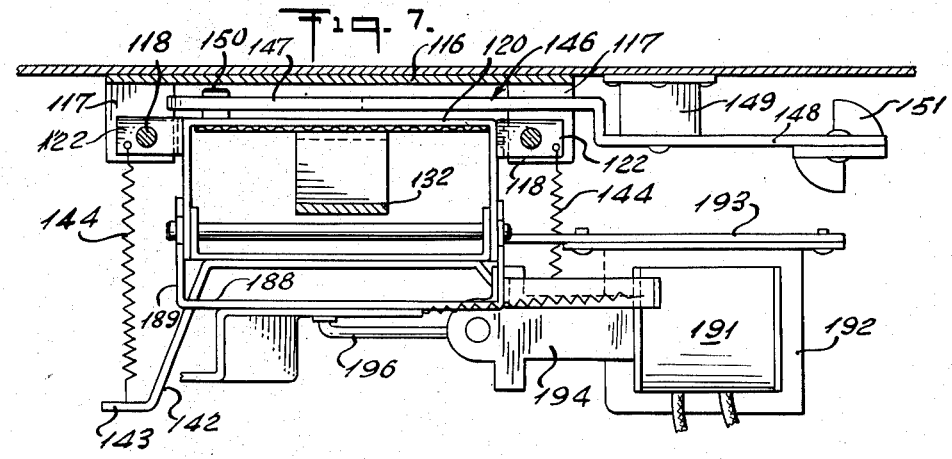
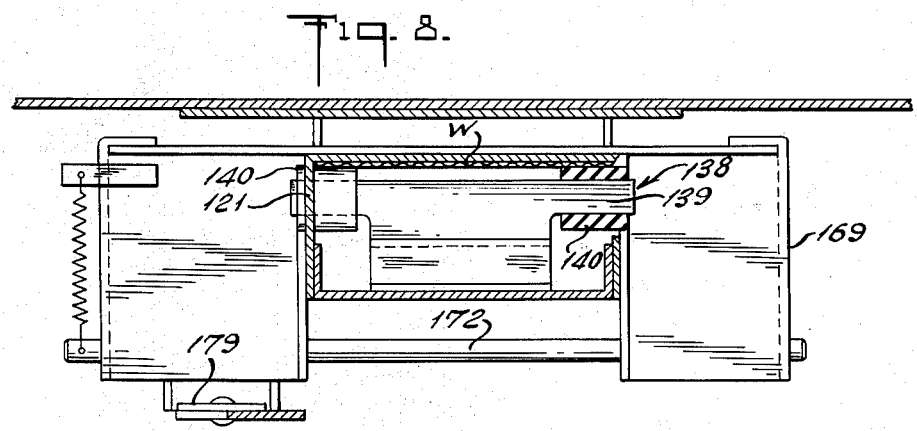
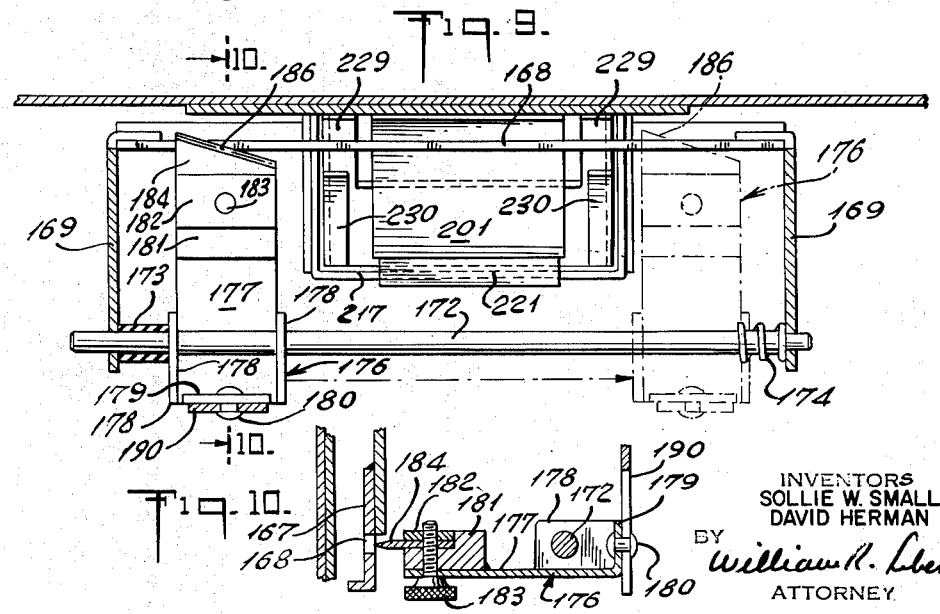
INVENTORS
SOLLIE W. SMALL
DAVID HERMAN
BY
William R. Liberman
ATTORNEY

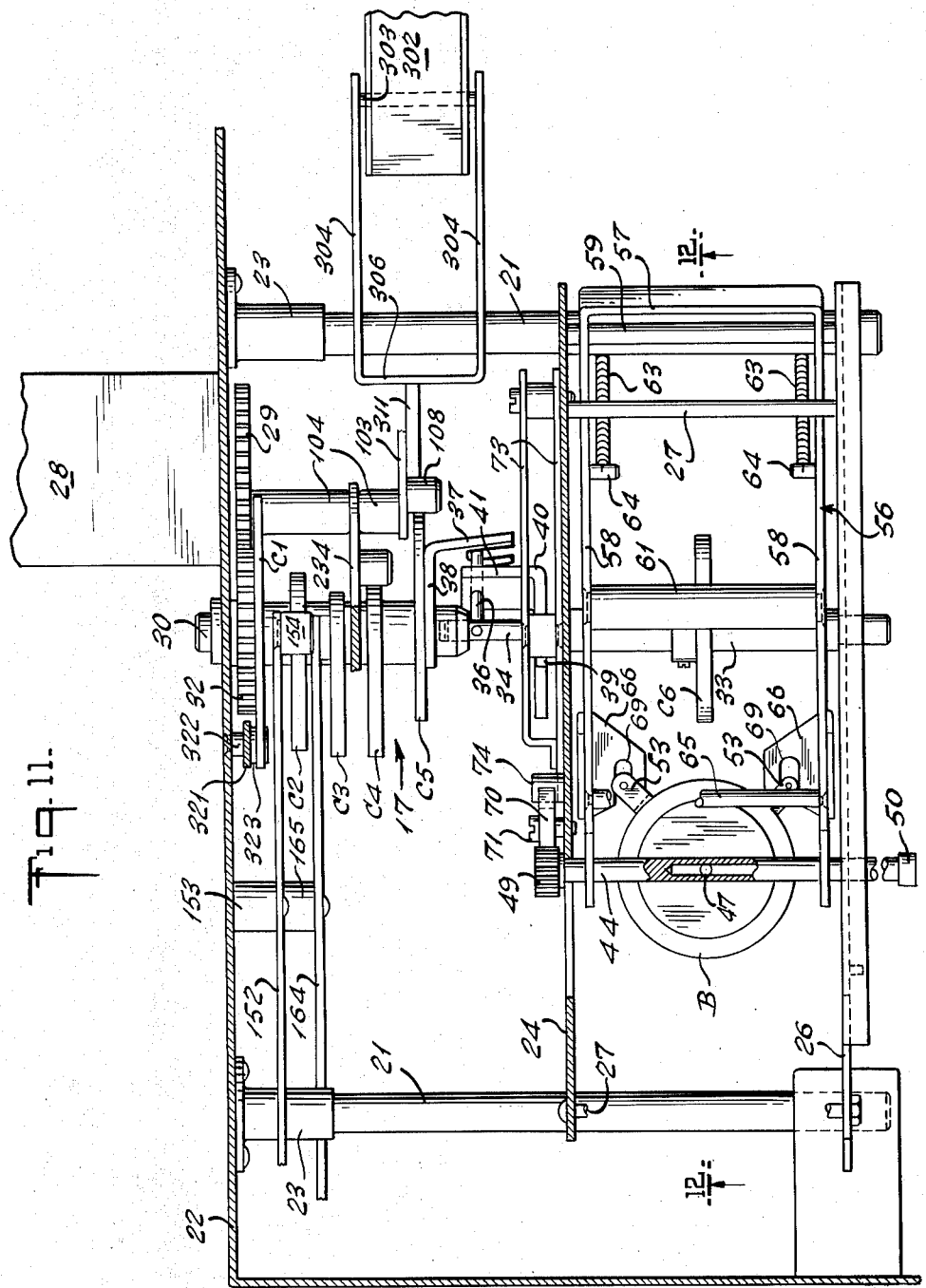

Dec. 7, 1965  S. W. SMALL ETAL  3,221,637
APPARATUS FOR BREWING AND DISPENSING BEVERAGES
Original Filed July 14, 1961  16 Sheets-Sheet 8
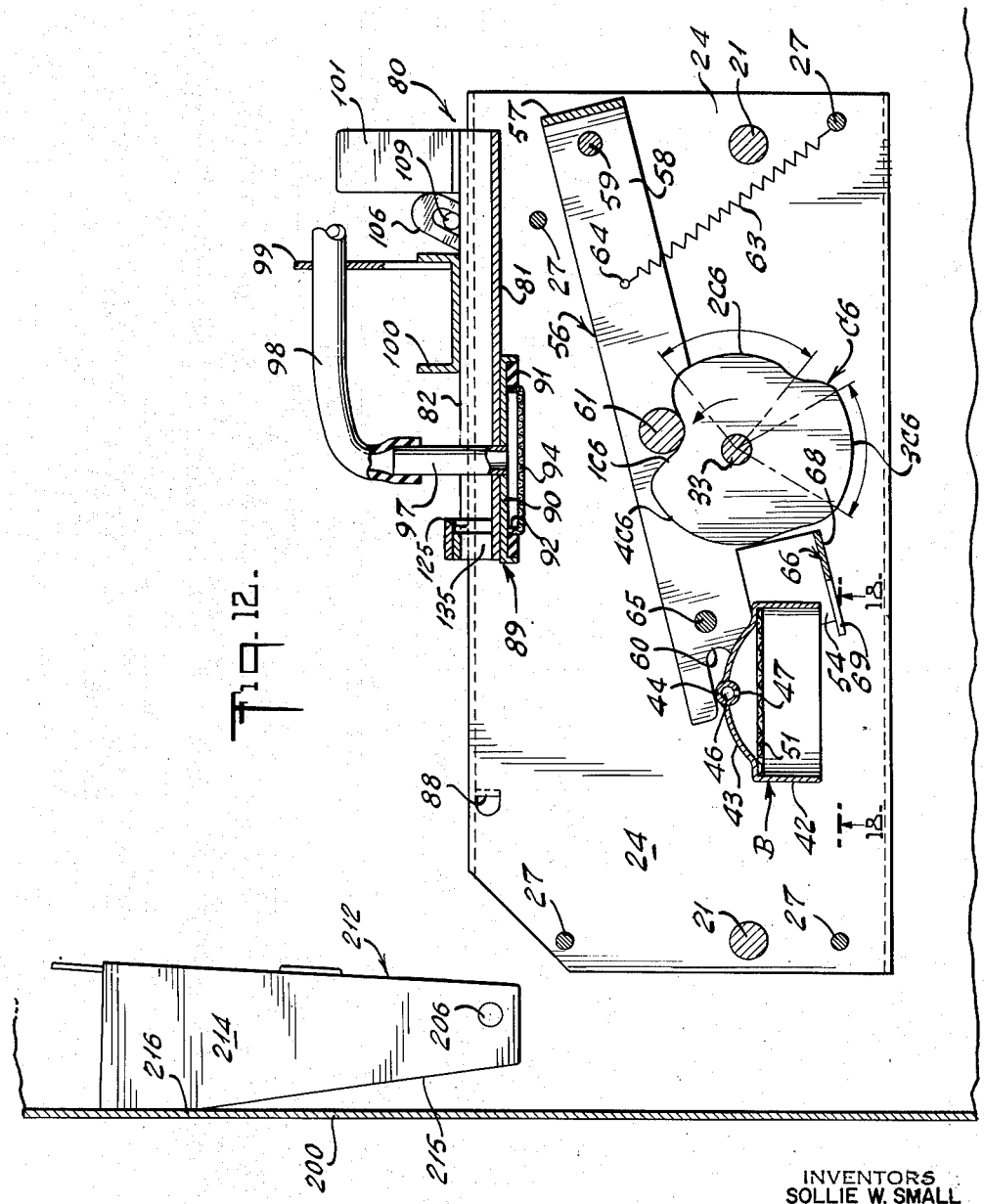
INVENTORS
SOLLIE W. SMALL
DAVID HERMAN
BY
William R. Liberman
ATTORNEY

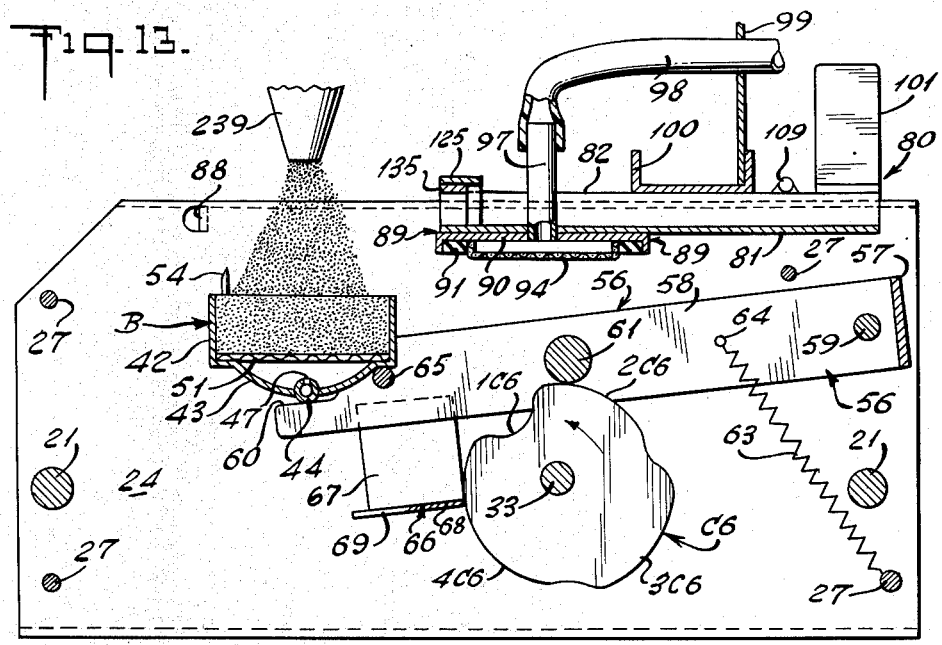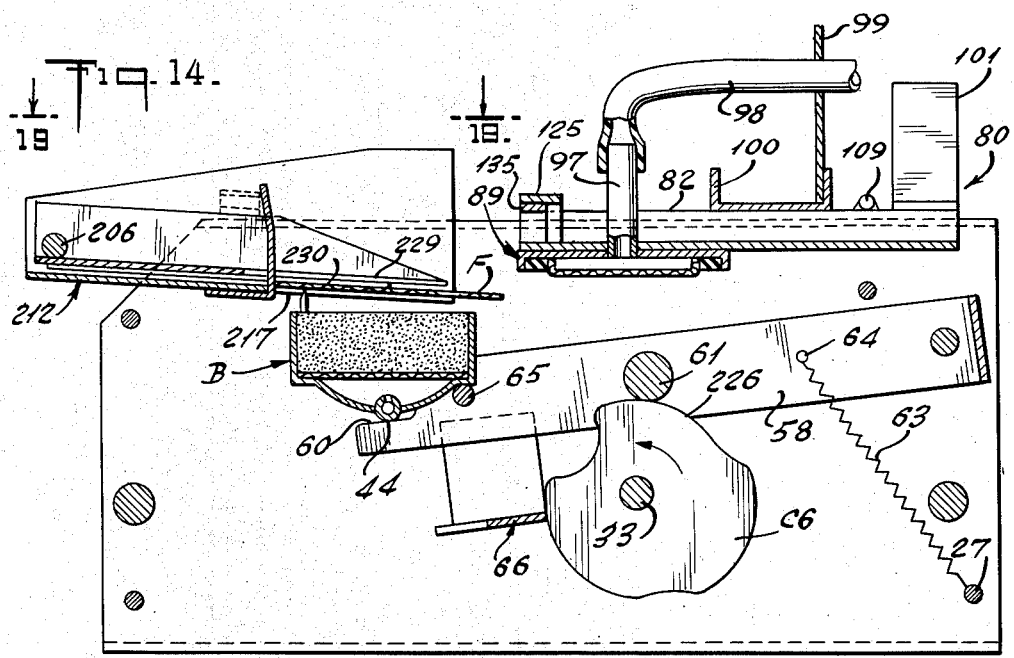

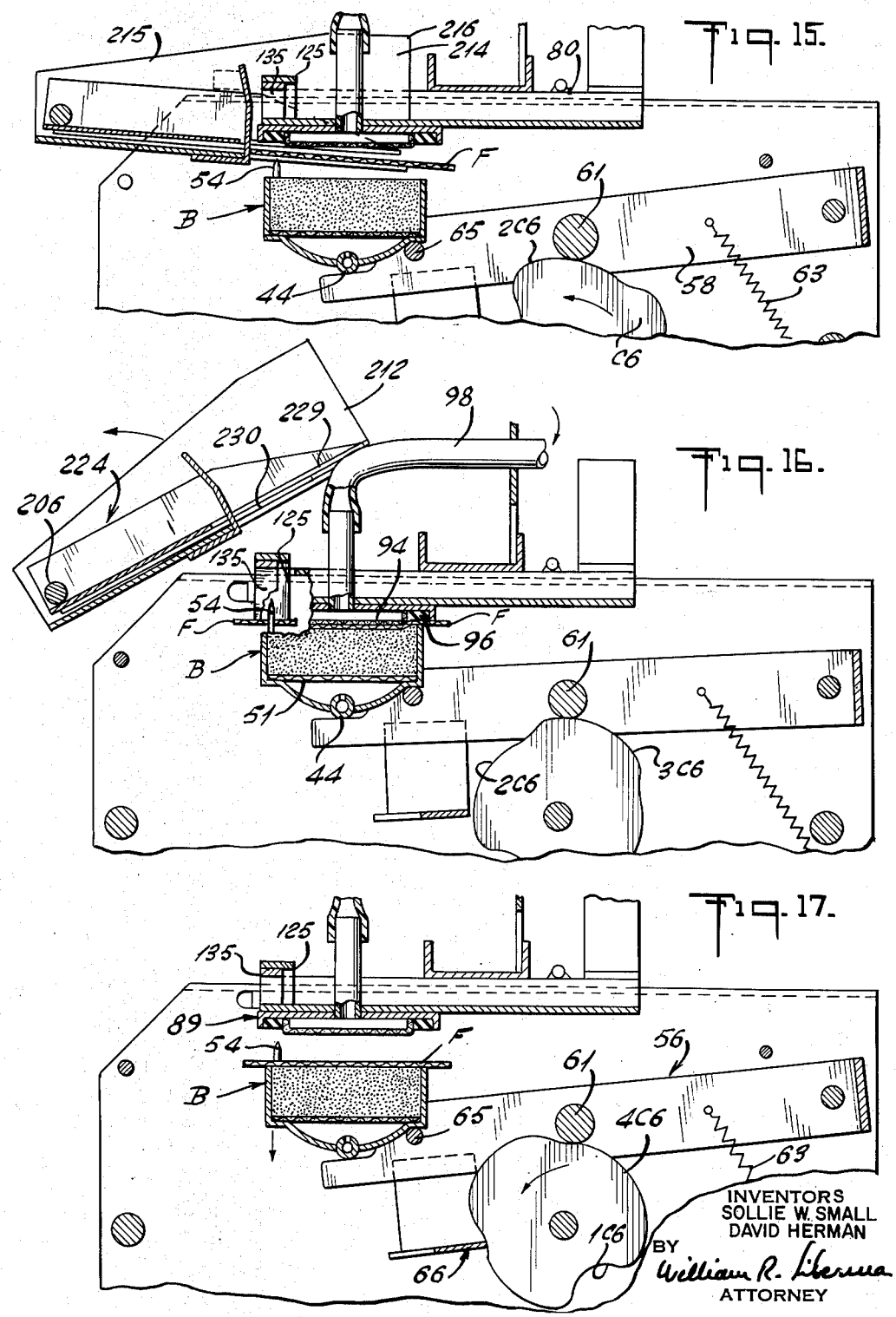

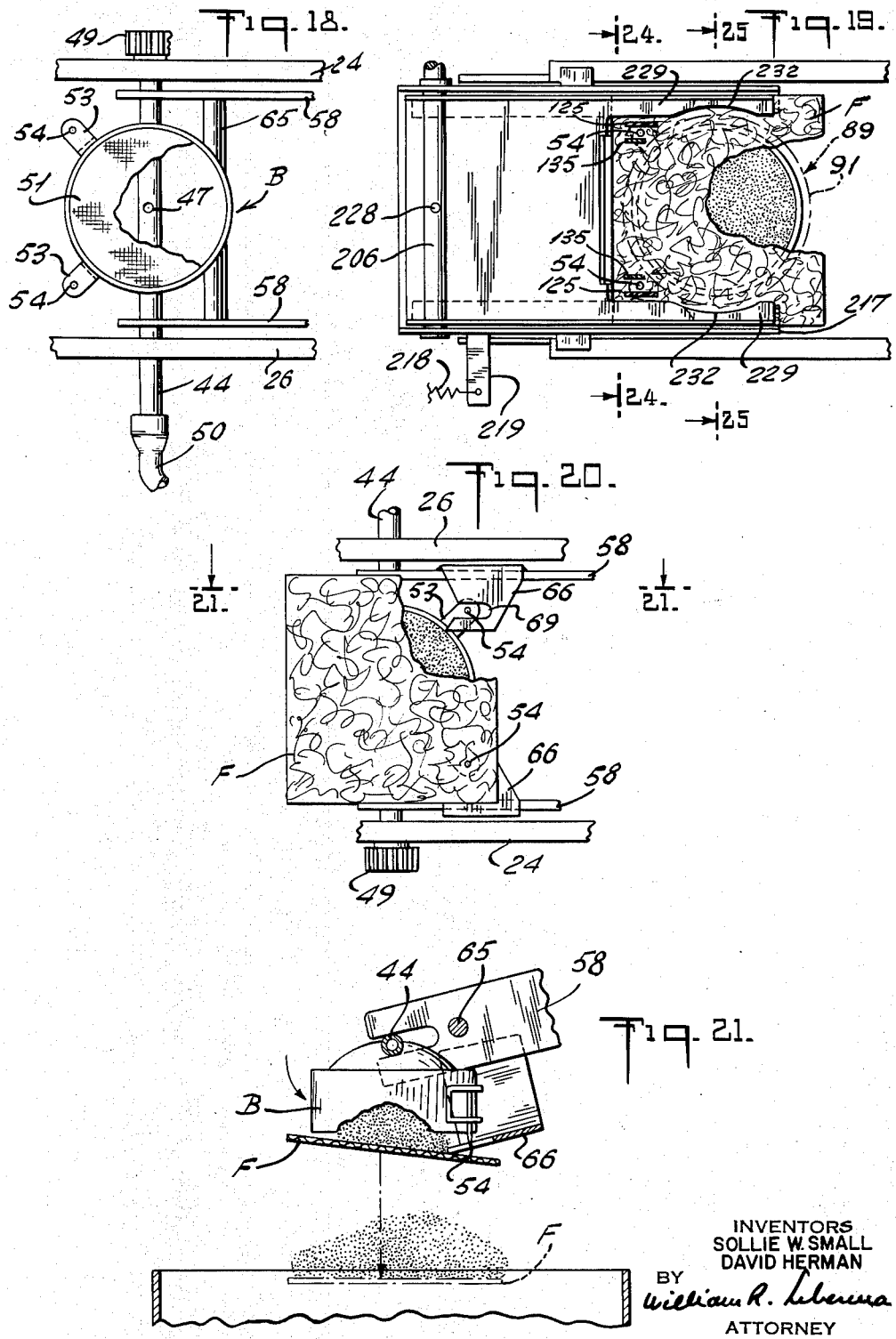

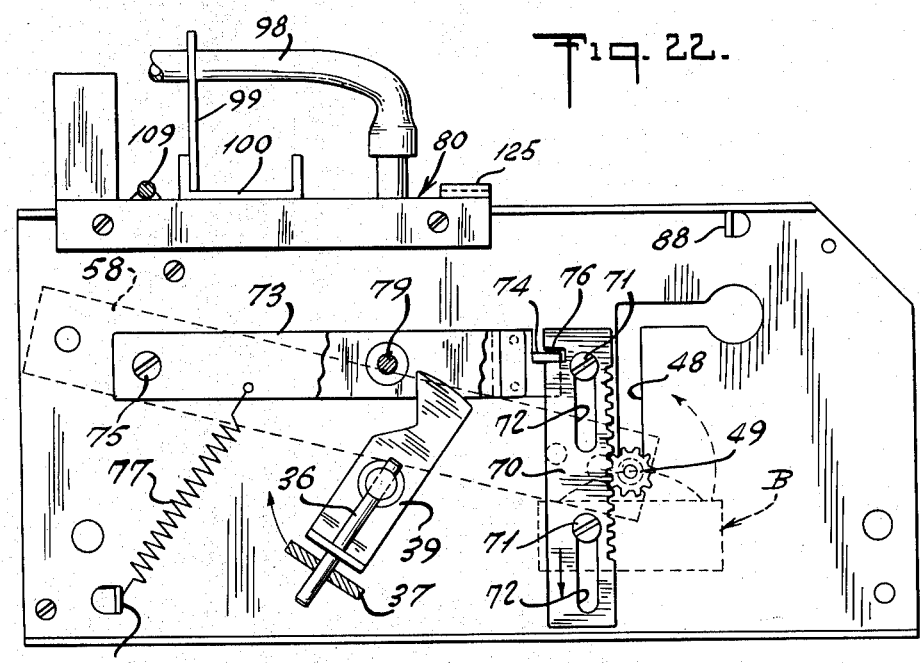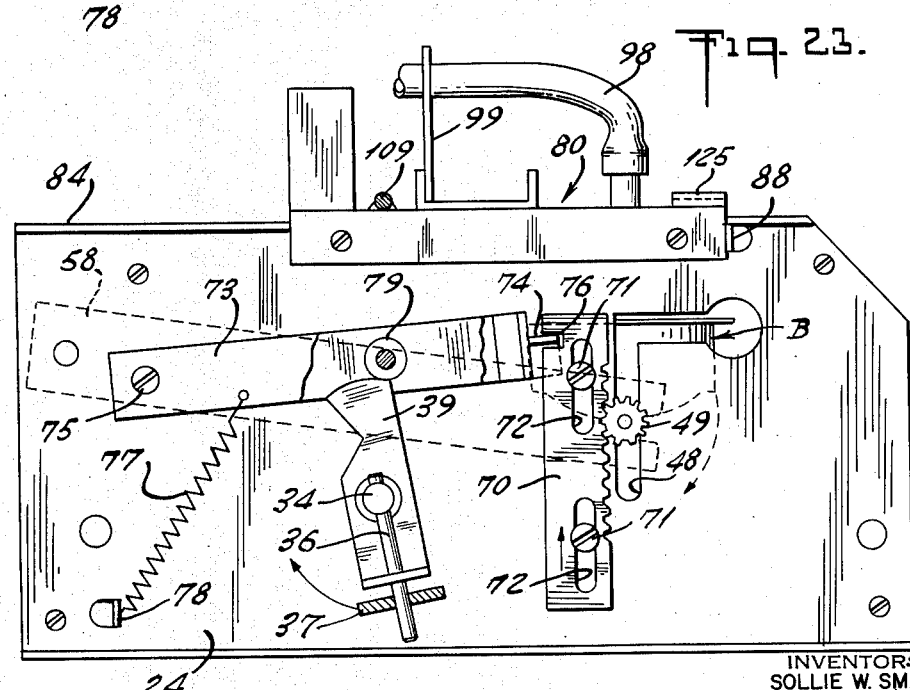

INVENTORS
SOLLIE W. SMALL
DAVID HERMAN
BY
William R. Liberman
ATTORNEY

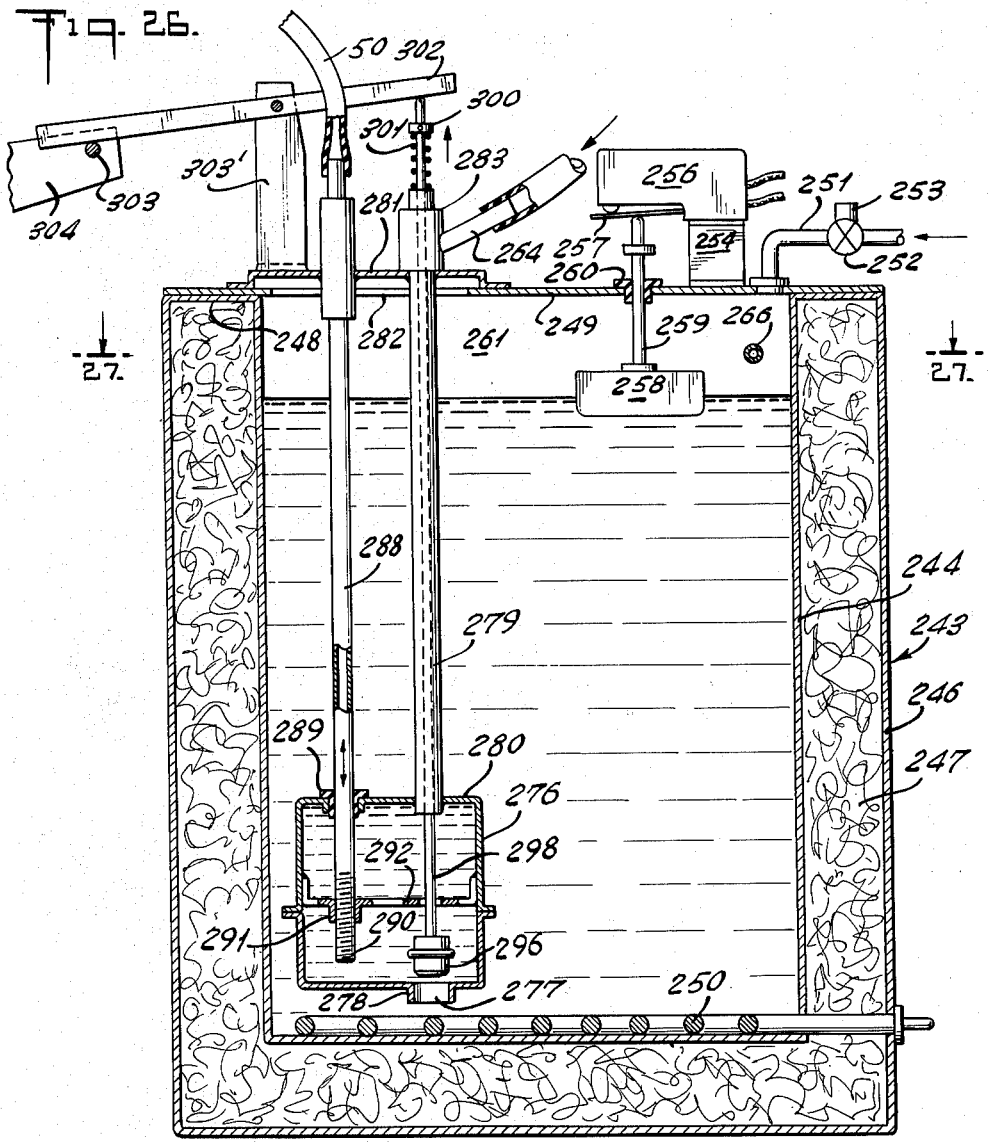
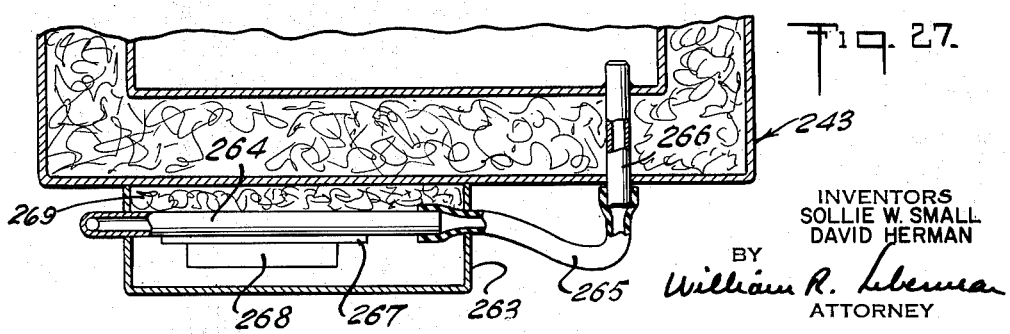

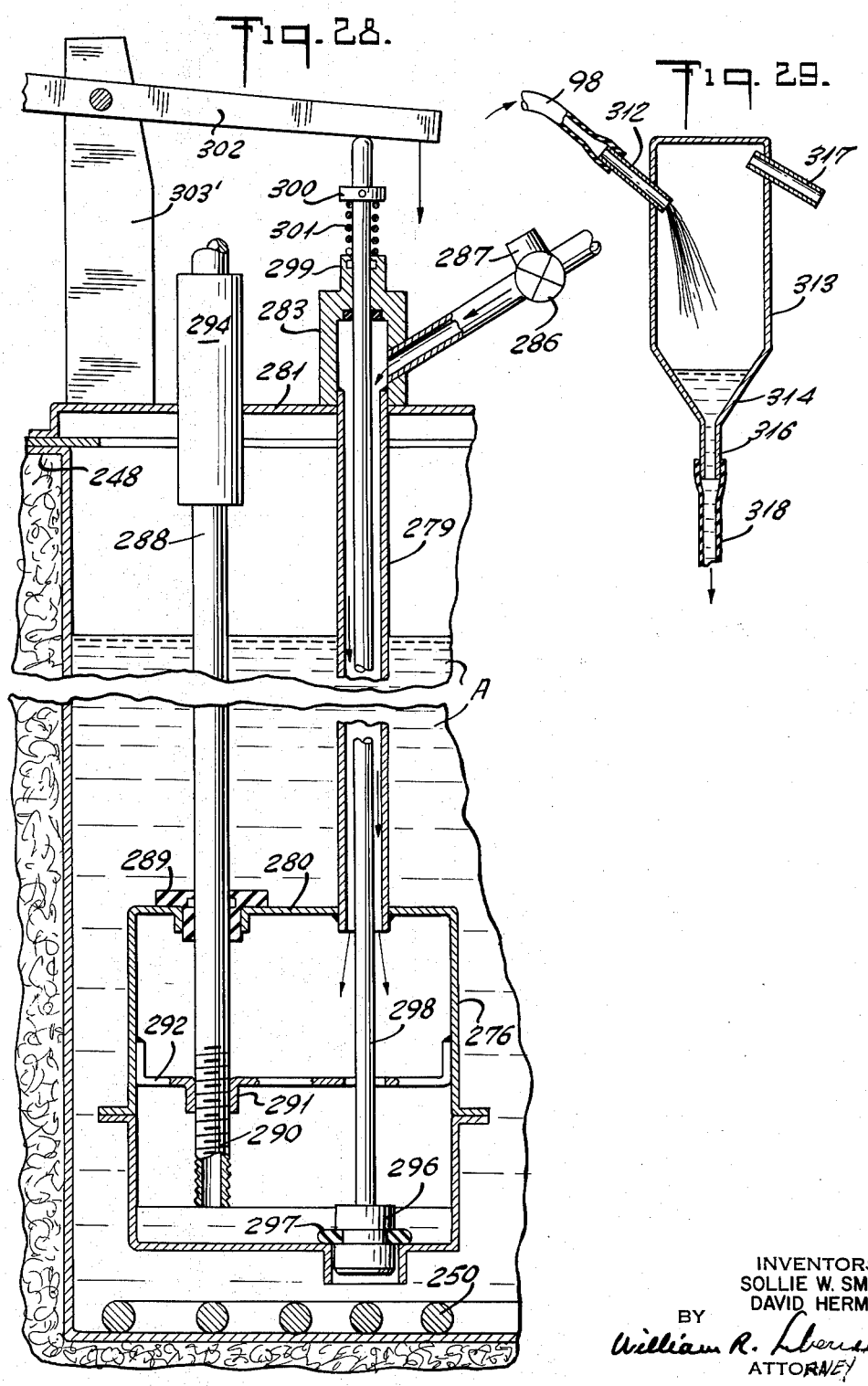

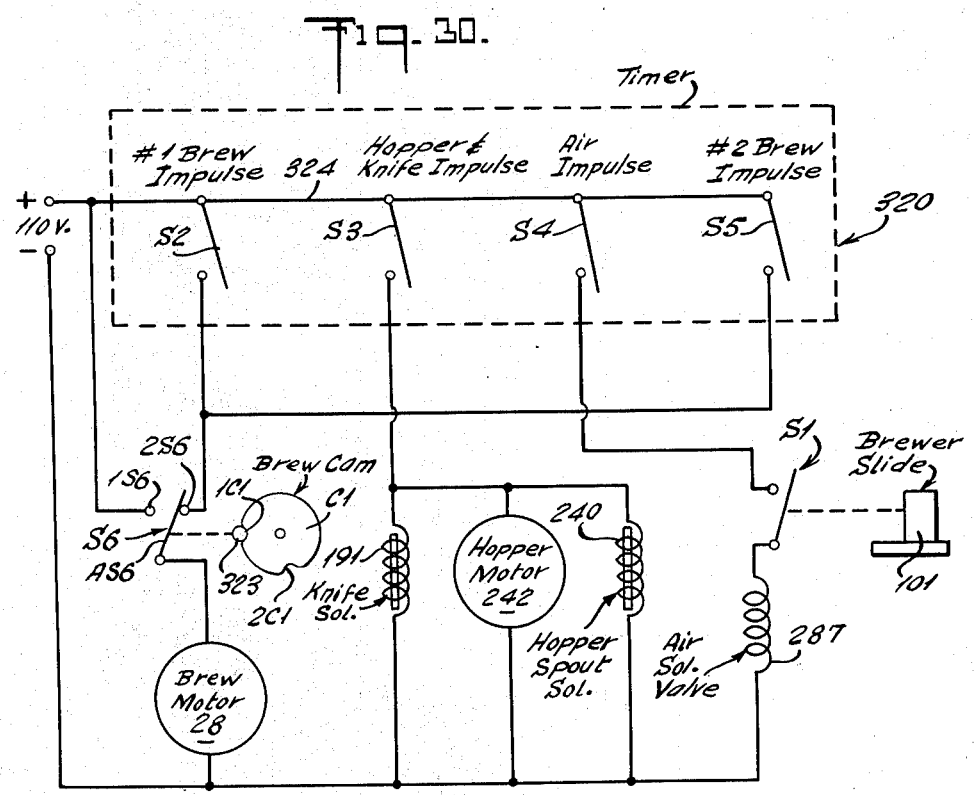
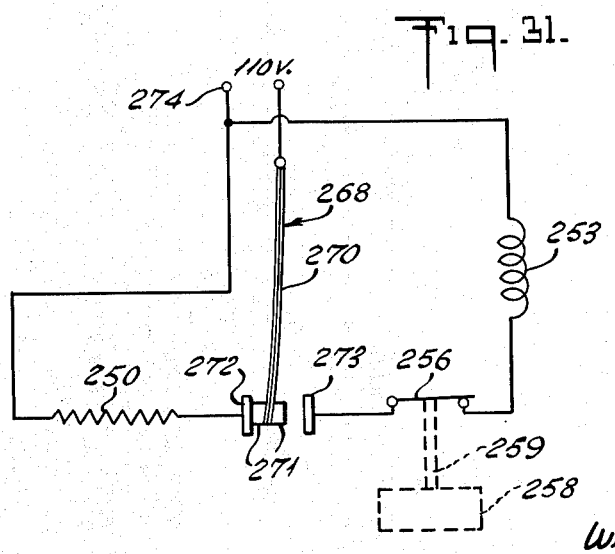

United States Patent Office 3,221,637
Patented Dec. 7, 1965

3,221,637
APPARATUS FOR BREWING AND DISPENSING BEVERAGES
Sollie W. Small and David Herman, Newark, N.J., assignors to Coffee-Mat Corporation, Elizabeth, N.J., a corporation of New Jersey
Continuation of application Ser. No. 124,027, July 14, 1961. This application Mar. 9, 1965, Ser. No. 444,892
35 Claims. (Cl. 99—289)

This application is a continuation of our copending application, Serial No. 124,207, filed July 14, 1961, now abandoned.

The present invention relates generally to improvements in apparatus for the production of beverages, and it relates in particular to an improved apparatus for the brewing and dispensing of coffee beverage in unit quantities.

In the conventional hot coffee vending and dispensing machines, the coffee flavor is generally stored in the vending machine as a liquid coffee flavor concentrate or extract. Upon coin actuation of the vending machine, measured quantities of the coffee flavor and hot water are admixed as well as a sweetening material, also cream if preselected, and the resulting beverage is discharged into and dispensed in a cup. While the coffee vending machines heretofore employed and proposed operate satisfactorily from a mechanical point of view they leave much to be desired insofar as the quality of the end product is concerned. Not only is the flavor of the dispensed coffee generally inferior but it deteriorates with time and is non-uniform from cup to cup. This is in part an inevitable consequence of the use of coffee extracts and concentrates in preparing the beverage instead of freshly brewing the coffee from the coffee grounds. Another contributing fact to the inferior quality of the conventional machine vended coffee is the wide variation in the temperature of the beverage water which adversely affects the end product. While automatic coffee brewing and dispensing mechanisms have been proposed, these have been complex and costly, the prepared beverage has been expensive, and the machines possessed numerous drawbacks and disadvantages as is evidenced by the fact that they are not in commercial use to any appreciable extent.

It it, therefore, a principal object of the present invention to provide an improved apparatus for producing beverages.

Another object of the present invention is to provide an improved coffee beverage vending and dispensing apparatus.

Still another object of the present invention is to provide an improved machine for automatically brewing and dispensing a predetermined unit amount of coffee.

A further object of the present invention is to provide improved automatic equipment for producing and dispensing a cup of coffee freshly brewed from the coffee grounds, in which a fresh filter element and fresh coffee grounds are employed for each cup of the beverage.

A further object of the present invention is to provide an improved coffee brewing apparatus in which a filter element is automatically formed from a strip of filter material with each cycle of the brewing operation.

Another object of the present invention is to provide an improved hot water metering apparatus.

Still another object of the present invention is to provide an improved water heating and storing apparatus.

A further object of the present invention is to provide a brewing apparatus of the above nature characterized by its ruggedness, simplicity, reliability of operation, flexibility, and high quality of the end product.

The above and other objects of the present invention will become apparent from a reading of the following description taken in conjunction with the accompanying drawings, wherein:

FIGURE 4 is a sectional view taken along line 4—4 in FIGURE 3;

FIGURE 4a is a sectional view taken along line 4a—4a in FIGURE 3;

FIGURES 5 and 6 are views similar to FIGURE 4 illustrating, however, the filter web advancing and transfer mechanism in successive operational positions;

FIGURES 5a and 6a are views similar to FIGURE 5, the web clamping mechanism control being illustrated in successive positions corresponding to FIGURES 5 and 6;

FIGURE 7 is a sectional view taken along line 7—7 in FIGURE 3;

FIGURE 8 is a sectional view taken along line 8—8 in FIGURE 3;

FIGURE 9 is a sectional view taken along line 9—9 in FIGURE 3;

FIGURE 10 is a sectional view taken along line 10—10 in FIGURE 9;

FIGURE 11 is a sectional view taken along line 11—11 in FIGURE 2, with —80 removed;

FIGURE 12 is a sectional view taken along line 12—12 in FIGURE 11, the brew receptacle being in its retracted inverted rest position;

FIGURES 13, 14, 15, 16 and 17 are views similar to FIGURE 12, the brew mechanisms being illustrated, however, at successive steps of its operation sequence;

FIGURE 18 is a fragmentary sectional view taken along line 18—18 in FIGURE 12;

FIGURE 19 is a fragmentary sectional view taken along line 19—19 in FIGURE 14;

FIGURE 20 is a fragmentary bottom plan view of the brew receptacle handling mechanism approaching the end of the operation cycle illustrating the stripping of the filter element and the dumping of the spent grounds;

FIGURE 21 is a sectional view taken along line 21—21 in FIGURE 20;

FIGURE 22 is a rear elevational view of the brewer assembly;

FIGURE 23 is a view similar to FIGURE 22 illustrating the brewer assembly in an advanced position thereof;

FIGURE 26 is a vertical sectional view of the hot water tank and water feed mechanism;

FIGURE 27 is a fragmentary sectional view taken along line 27—27 in FIGURE 26;

FIGURE 28 is an enlarged fragmentary view similar to FIGURE 26 showing, however, the mechanism in a water discharge position;

FIGURE 29 is a vertical sectional view of the air beverage separator;

FIGURE 30 is a schematic view of the electrical circuit controlling cycle of operation of the improved apparatus; and FIGURE 31 is a schematic view of the water tank filling and heating circuit.

Figure 1:
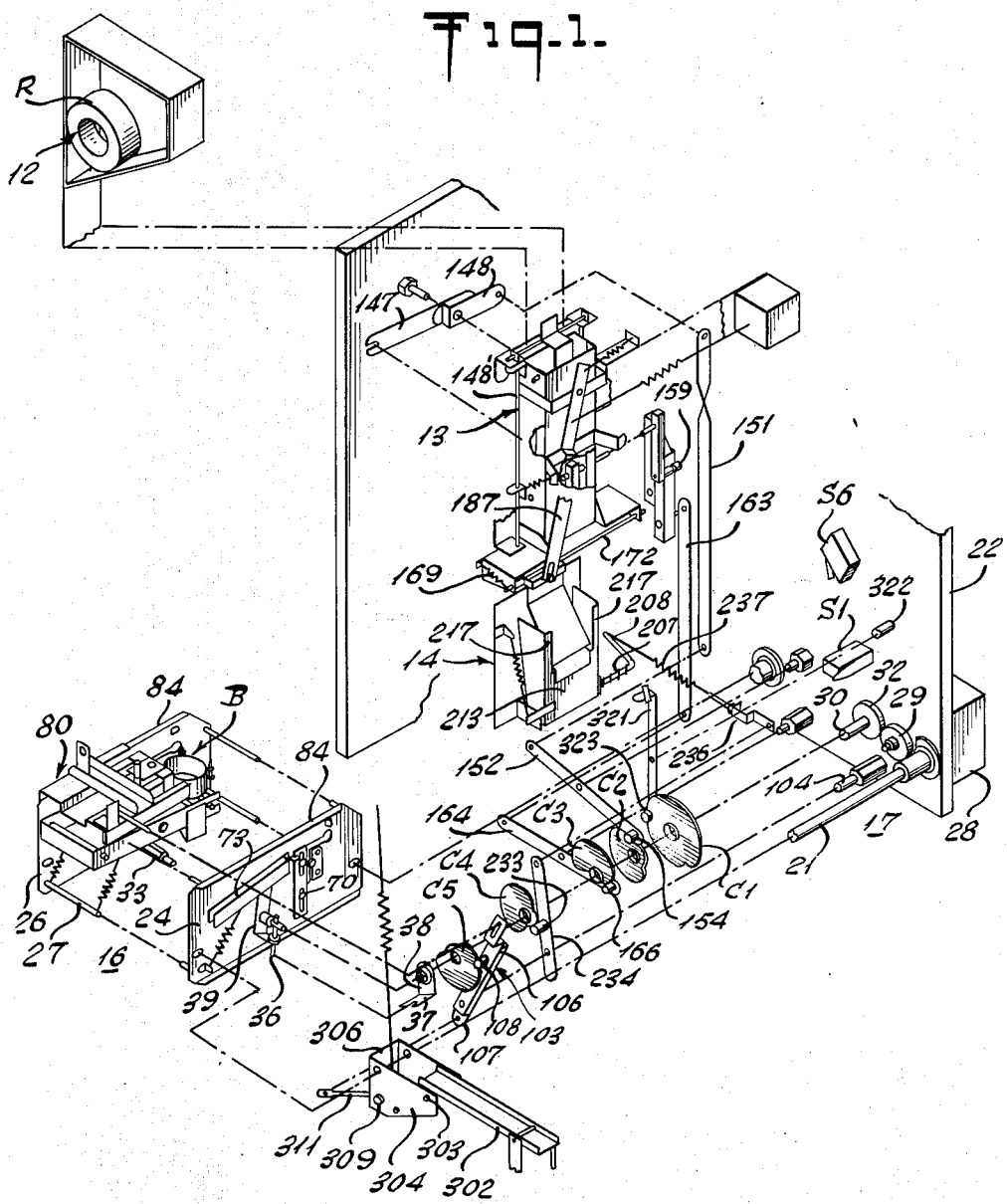
FIGURE 1 is a fragmentary perspective view of one form of the filter element forming and handling mechanism and the brew and sequence control assembly constructed in accordance with and embodying the present invention, parts being shown rotationally and laterally offset for convenience of illustration.

In a sense, the present invention contemplates the provision of a completely automatic apparatus which freshly brews a cup or unit quantity of coffee beverage from the fresh coffee grounds and dispenses the beverage ready for consumption, the brewing and dispensing cycle being selectively initiated in any desired manner such as by a coin actuated device. The apparatus may be employed in any well known or conventional mechanism which effects the dispensing of a cup in a position below the coffee beverage discharge spout and the selective dispensing and mixing with the beverage of cream, milk and a suitable sweetening agent.

An important feature of the present invention is the improved brewing apparatus comprising a brew receptacle having inlet and outlet openings, means adapted to deposit a measured quantity of coffee grounds into said receptacle, means adapted to apply a filter element to said outlet opening, means adapted to releasably lock said filter element in registry with said outlet openings, means feeding water into said inlet opening which flows through said outlet opening by way of the coffee grounds in said receptacle, and means adapted to discharge said coffee grounds and said filter element from said brew receptacle. The brew receptacle is advantageously in the form of an open topped receptacle having the inlet opening formed in the bottom thereof. Motivating means are provided for rotating the brew receptacle, to an upright position, depositing a premeasured amount of coffee grounds into the cup, applying a filter element over the receptacle open top, sliding a lid defining brew head connected to an outlet conduit into registry with the open top of the brew receptacle and then raising the brew receptacle to its uppermost position to lock the filter element between the brew receptacle and brew head. The motivating means then actuates a hot water metering device which passes a predetermined amount of water through the brew receptacle carried coffee grounds, through the filter, and through the outlet conduit and thereafter retracts the brew head and reverses and lowers the brew receptacle to separate and discharge the filter element and the by then spent coffee grounds.

Another important feature of the present invention is the filter element forming and dispensing apparatus comprising a slide member movable between an advanced and a retracted position, guide means directing a web of filter material along said slide member, web clamp means disposed adjacent the leading end of said slide member, means urging said web clamp means toward engagement with said slide member during the advance movement thereof and out of engagement with said slide member during the retraction thereof, and a stationary clamp located between the leading and trailing ends of said slide member and adapted to engage said web to restrain the movement thereof. The slide member carries a web severing device along its leading end which is actuated when the slide member is in its advanced position. A swingable filter transfer member is disposed at the advanced position of the slide member, receives the severed filter element and transports it to the waiting brew receptacle as aforesaid.

A further feature of the present invention resides in the water dispensing device which comprises a water reservoir, a metering vessel immersed in said reservoir and having an inlet port formed therein communicating with said reservoir, an outlet conduit communicating with said vessel, a valve associated with said inlet port and movable between an open and closed position, means adapted to discharge the liquid from said vessel through said outlet conduit, and means alternately closing said port valve and actuating said discharge means, and deactivating said discharge means and opening said port valve. The discharge means is defined by a valved source of compressed air connected by an air conduit to the metering vessel, the outlet conduit extending into the metering vessel below the level of the air conduit. Water is delivered to the reservoir only when the level thereof falls below a predetermined point and the reservoir water exceeds a predetermined temperature.

Other features of the present invention will become apparent from the detailed description of the embodiment thereof as hereinafter set forth.

Figure 2:
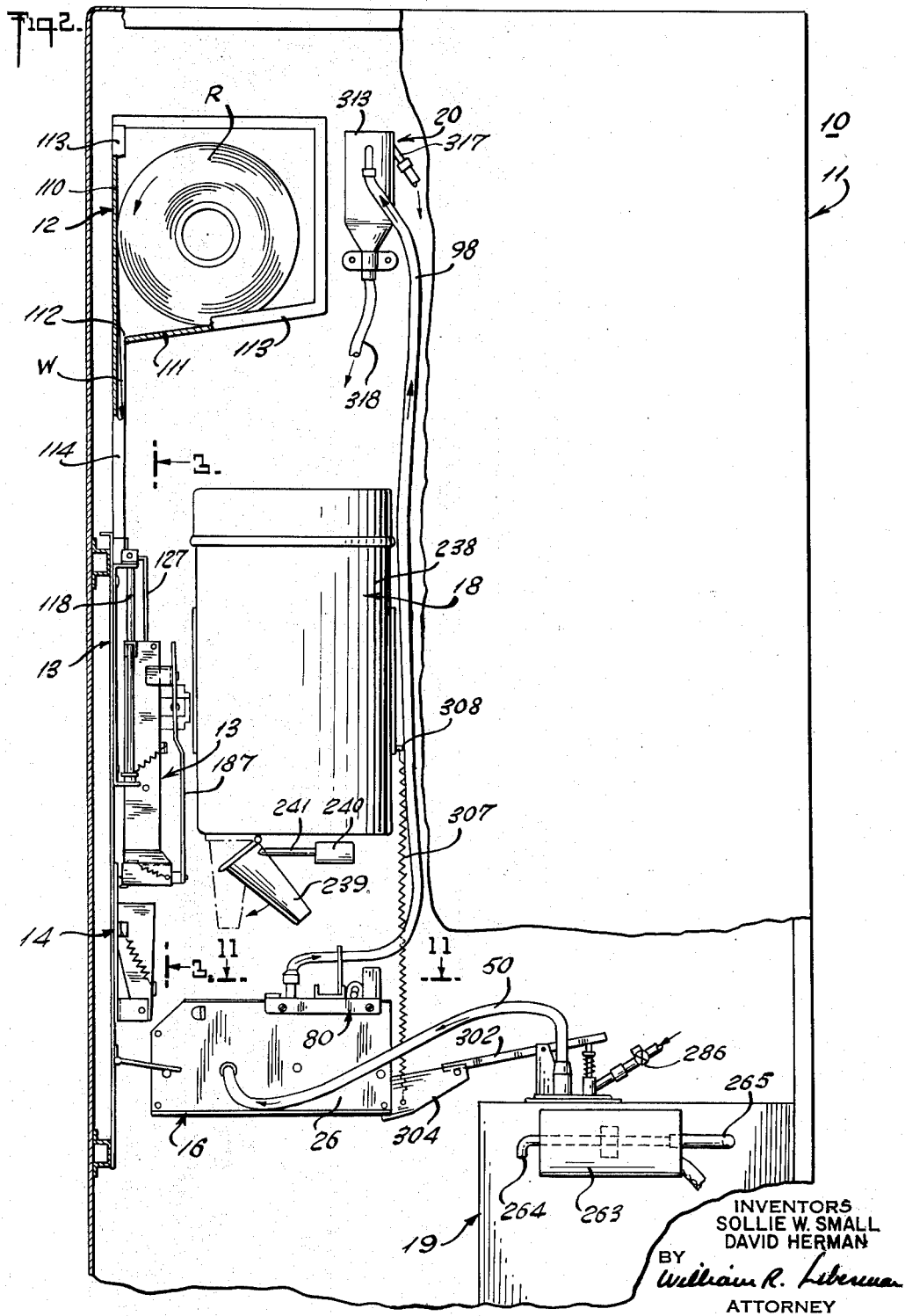
FIGURE 2 is a fragmentary front elevational view of the improved apparatus according to the present invention.

Referring now to the drawings which illustrate a preferred embodiment of the present invention, and particularly FIGURES 1 and 2, reference numeral 10 designates generally the improved apparatus which includes a cabinet 11 in which the various components and assemblies of the apparatus are suitably housed and mounted. The apparatus comprises a storage compartment 12 supporting a roll R of filter material web W in the upper part of the cabinet 11, a web feeding indexing and severing device 13 disposed below the storage compartment 12, and a filter element transfer mechanism 14, in turn disposed below the web indexing and severing device 13. Adjacent to and in alignment with transfer mechanism 14 is a brew assembly 16 which includes a cycle sequence control and motivating mechanism 17. A coffee metering hopper 18 is located above brew assembly 16. A hot water tank and feed water metering device 19 is disposed adjacent brew assembly 16 and a beverage air separator 20 is located in the upper part of cabinet 11.

The brew assembly 16 and sequence control assembly 17 are best seen in FIGURES 1, 2 and 11 through 25 of the drawings, and include a pair of laterally spaced cantilever rods 21 projecting from and mounted on a wall 22 by means of suitable brackets 23, which rods 21 carry a pair of parallel transversely spaced laterally extending mounting plates 24 and 26 disposed forward of the wall 22 and tied together by cross rods 27. Mounted on the rear face of wall 22 is an electric brew motor 28 having a drive shaft projecting through said wall 22 and carrying a drive gear 29. A sequence timing first cam shaft 30 is suitably journalled to wall 22 and projects forwardly thereof and carries a gear 32 mating with the motor driven gear 29. A brewer second cam shaft 33 is disposed in axial alignment with the first cam shaft 30, and is journalled between mounting plates 24 and 26. An integrally formed axial stub shaft 34, of reduced cross section, projects rearwardly from cam shaft 33 and register with an axial well formed in the leading end of cam shaft 30, a radially projecting coupling rod 36 being affixed to shaft 34. A transversely extending yoke member 37 is radially offset relative to cam shaft 30 and is mounted adjacent the leading end thereof by means of a radial arm 38 secured to cam shaft 30. Mounted on cam shaft 33, adjacent to the outer face of plate 24, is a radially extending lock arm 39 having an arcuate outer edge whose center is on the axis of cam shaft 33 and being provided with an arm 40 projecting therefrom in a direction opposite said arcuate edge and terminating in a rearwardly directed leg 41. Coupling rod 36 passes through an aligned opening formed on leg 41 and is engaged by yoke 37 which causes cam shafts 30 and 33 and lock arm 39 to rotate in unison.

Mounted on cam shaft 30 and spaced along the length thereof and rotatable therewith are a plurality of timing and motivating cams C1, C2, C3, C4 and C5, the shapes and relative phasing and angular positions of which will be described hereinafter. Cam C1 controls the energization of brew motor 28; cam C2 motivates the filter indexing mechanism; cam C3 motivates the filter clamping device; cam C4 motivates the filter transfer mechanism; and cam C5 effects the sliding of the brew head and the motivating of the hot water feed value. A cam C6 is mounted on cam shaft 33 and effects the movement of the brew receptacle.

Figure 24:
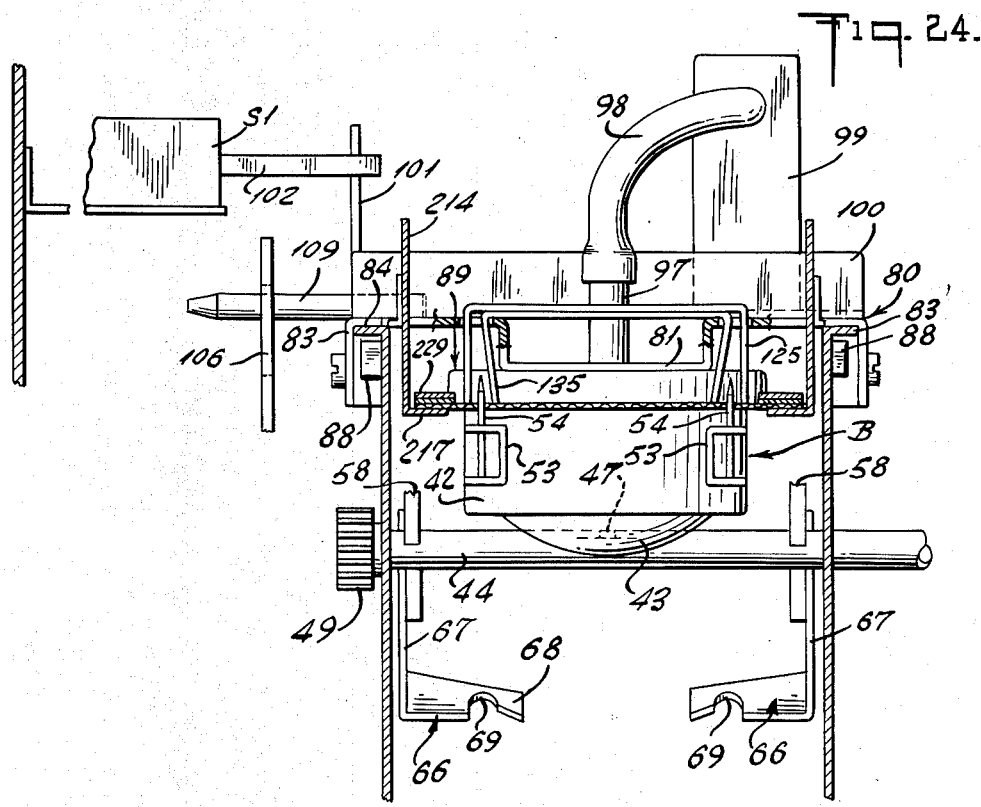
FIGURE 24 is a sectional view taken along line 24—24 in FIGURE 19.
Figure 25:
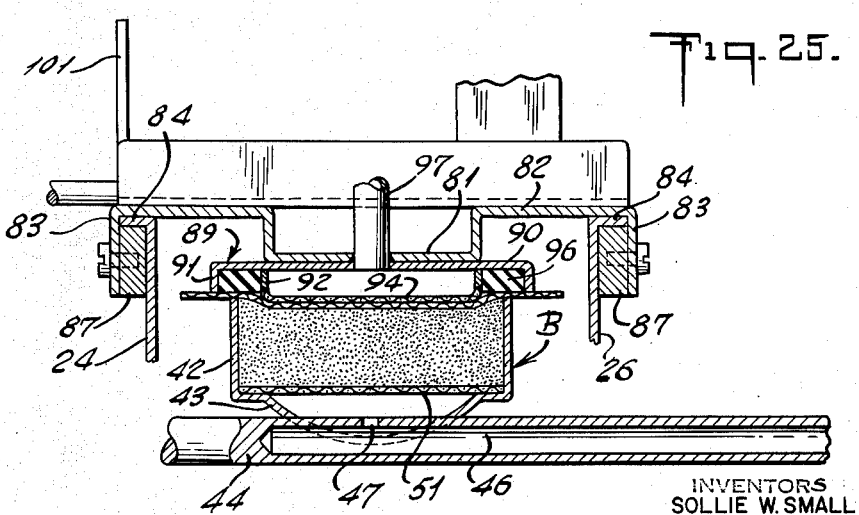
FIGURE 25 is a sectional view taken along line 25—25 in FIGURE 19, parts being omitted for clarity of illustration.

The brew receptacle is of open topped cup shaped configuration and is designated by the letter B and, as best seen in FIGURES 24 and 25, includes a cylindrical wall 42 and a downwardly convex or dished bottom wall 43 connected to the lower edge of wall 42 by a peripheral flange. The receptacle bottom wall 43 has a transversely extending slot formed therein which registers with a transversely extending shaft 44 and is affixed in liquid tight relationship thereto. Formed in shaft 44 is a longitudinally extending bore 46 which communicates with the bottom of receptacle B by way of an opening or port 47 formed in the wall of shaft 44, the bore 46 extending only to one end of shaft 44. The opposite ends of shaft 44 project through and slidably register with transversely aligned vertical slots 48 (FIGURES 22 and 23) formed in plates 24 and 26. The end of shaft 44 adjacent plate 24 is closed and has affixed to the free end thereof along the outer face of plate 24 a pinion 49. The opposite end of shaft 44 is connected to a flexible pipe 50.

A perforated plate or screen member 51 rests on and is secured by welding or the like to the peripheral border of the receptacle bottom wall 43 and has openings therein which will not permit the passage of fine coffee grounds but will permit the free passage of water. Projecting laterally from and affixed to the side face of receptacle wall 42 are a pair of transversely spaced brackets 53 having upper and lower arms. An upwardly directed pointed pin element 54 is carried by each of brackets 53 and projects above the upper edge of receptacle wall 42, said pin elements 54 lying along a line approximately tangent to the face of the wall 42.

A yoke member 56 (FIGURES 11 and 12), including a bridge section 57 and a pair of transversely spaced laterally projecting parallel yoke arms 58, is located between plates 24 and 26 and is swingably supported by an axle 59 registering with aligned openings in the trailing ends of the arms 58 and the upper side edges of plates 24 and 26. The leading ends of arms 58 have recesses 60 formed therein which engage shaft 44 adjacent the inner faces of plates 24 and 26 and is vertically movable therewith, shaft 44 being restricted to a vertical movement by slots 48. A cam follower member 61 is supported by and between yoke arms 58 intermediate the ends thereof and engages the cam surface of cam C5. Yoke 56 is resiliently urged in a counterclockwise direction, as seen in FIGURE 12 in the drawing, by a pair of tension springs 63 extending from pins 64 on arms 58 to a lower tie rod 27, thereby to urge shaft 44 and brew cup B downwardly and cam follower 61 into contact with cam C6.

In order to prevent rotation of brew receptacle B beyond its upright position, a stop bar 65 is carried by and between yoke arms 58 and registers with the border of the underface of receptacle B when the latter is in its upright position. A pair of filter stripping members 66 is carried by yoke arms 58 rearward of the leading ends thereof, and each includes a depending leg 67 terminating in an inwardly directed stripping plate 68 having formed therein a notch 69 which registers with a corresponding pin 54 when the receptacle B is in its inverted position. Cam C6 includes along its cam surface a rest or fully depressed section 1C6 a first slightly depressed section 2C6 relative to the section 3C6 extending about 90°, a fully raised section 3C6 and a terminating, slightly depressed section 4C6 relative to the section 3C6, the successive cam sections being connected by non circumferential connecting sections, and the sections 2C6, 3C6 and 4C6 being arcuately concentric with the cam axis.

A vertical rack 70 (FIGURES 22 and 23) engages pinion gear 49 and is slidably mounted on the outer face of plate 24 by means of plate supported screws 71 registering with vertical slots 72 formed in the rack 70. A lever defining laterally extending pair of transversely spaced parallel arms 73 joined adjacent their leading ends is pivoted at its trailing end to the outer face of plate 24 by a pin 75, and is provided at its leading end with a transversely projecting lug 74 which engages a notch 76 formed in a vertical edge of rack 70. The lever 73 is resiliently urged to its depressed position by a tension spring 77 connected between lever 73 and a lug 78 projecting from a lower corner of plate 24. Supported by and between the arms defining the lever 73 is a cam follower 79 which registers with the free end of lock arm 39 when the latter is in an upright position to prevent the lowering of lever 73 and rack 70. It should be noted that lock arm 39 and cam follower 79 are in registry when follower 61 is in its passage along cam C6 from cam section 4C6 to home section 1C6.

The brew assembly, as best seen in FIGURES 4, 12, 24 and 25, includes a slide plate 80 having a medial longitudinal channel extending along the length thereof and provided with a flat bottom wall 81. Longitudinal plates 82 extend along the sides of slide 80 and terminate in depending lips 83, the outer borders of plates 82 slidably resting on flanges 84 directed outwardly from the upper edges of plates 24 and 26. In order to restrict the plate 80 to a sliding movement along flanges 84, a pair of lock bars 87 are screw-secured to the inner faces of lips 83 and slideably engage the under faces of flanges 84 and the outer upper borders of plates 24 and 26. A pair of oppositely disposed lugs 88 (FIGURES 22-24) are located on plates 24 and 26 in the path of bars 87 to limit the forward movement of slide plate 80.

Secured to the underface of slide channel wall 81 is a brew head-defining cap member 89, including a top disc shaped wall 90 underlying channel wall 81 and of somewhat larger diameter than brew receptacle wall 42 and terminating in a depending peripheral skirt 91. A concentric collar of somewhat smaller diameter than that of receptacle wall 42 depends from the cap wall 90 to a level slightly above that of the lower edge of skirt 91, and has secured to its lower edge a filter element reinforcing perforate plate or screen member 94. Nesting in the space delineated by skirt 91 and collar 92 is a resilient annular gasket or washer 96 formed of rubber or other suitable material. An upright outlet pipe 97 communicates with the interior of head 89 by way of a central opening formed therein, and is connected to the beverage outlet by way of a coupled flexible tube 98. Tube 98 extends through an opening in a transversely offset upright bracket plate 99 carried by a channel member 100 extending across and affixed to top of slide 80. Also projecting upwardly from slide 80, at its trailing end, is an arm 101. A normally open switch S1 (FIGURE 4) is suitably supported and provided with a switch closing actuating arm 102 disposed in the path of arm 101 to be engaged and motivated thereby when slide 80 is in its fully advanced position.

The brew head carrying slide 80 is moved between its retracted and advanced position, as illustrated in FIGURES 22 and 23 of the drawings respectively, in properly timed relation by cam C5 (FIGURES 1 and 11). A rocker lever 103 is pivoted between its ends to a pin support port 104 and is provided with opposite upper and lower legs 106 and 107. A cam follower 108 is mounted on lever leg 106 between its ends and engages cam C5, the uper end of leg 106 having a longitudinal slot formed therein which engages a pin 109 mounted in and projecting transversely from slide 80. Thus, the rocking of lever 103 by cam C5 effects reciprocation of slide 80. When cam follower 108 engages the raised section of cam C5, slide 80 is in its retracted position, and when it engages the cam depressed section slide 80 is in its advanced position, cam C5 being so shaped and phased that slide 80 is in its advanced or brew position only from the times follower 61 engages the trailing end of cam section 2C6 along the cam section 3C6 and to the leading end of cam section 4C6.

Storage compartment 12 (FIGURE 2) includes a vertical side wall 110, a bottom wall 111 downwardly inclined toward side wall 110 and spaced therefrom by a transverse exit slot 112 and forming an acute angle therewith, a top wall and an opposite side wall. The compartment walls are provided with inwardly directed flanges 113 which retain the roll R of filter material within the compartment 12. The filter material is a band or web W of somewhat greater width than the brew receptacle, and is formed of any suitable filter material such as cotton, rayon, paper or the like. The filter web W is withdrawn from roll R through a depending guide channel 114 vertically aligned with exit slot 112, and a uniform restraining tension is applied thereto by reason of the wedging action of roll R in the dihedral defined by compartment walls 110 and 111. As web W is pulled from the roll R it is urged against wall 110 not only by reason of the weight of the roll but likewise by the rotation of the roll R toward wall 110 thereby to effect a wedging action on roll R.

The filter element preparing mechanism 13 (FIGURES 3 to 10) is carried by a vertical support plate 116 suitably mounted along a side wall of cabinet 11, and is provided with forwardly directed horizontal bracket lugs 117 which support a pair of transversely spaced vertical track defining guide rods 118. An indexing slide member 119 is of channel shape and comprises a vertical base plate 120 disposed forward of support plate 116 and along the rear of guide rods 118, and is provided with forwardly directed flanges 121 along its longitudinal edges. Projecting outwardly from flanges 121 at their upper ends and at intermediate points are bracket lugs 122 having openings registering with guide rods 118 to permit slide member 119 to move between an upper retracted position and a lower advance position, as seen in FIGURES 5 and 6 of the drawings respectively.

Formed in the lower section of slide base plate 120 is a vertically extending, medially located slot 123. A U-shaped jaw element 124 is affixed to the support plate 116 and is provided with a pad-defining vertical arm 126 registering with slot 123, and being substantially coplanar with slide plate 120. A vertically extending web hold-down arm 127 is medially disposed relative to slide member 119 and includes an upper rearwardly directed angle section 128 secured at its crotch to a transverse rod 129, rotatably supported by and between a pair of lugs 130 mounted on legs directed forwardly from the upper edge of support plate 116. Depending from the forward edge of angle section 128 is a vertical arm 131 which is connected by an inclined arm to a vertical leg 132 which gravity urged ot bear against the confronting faces of slide base plate 120 and pad member 126 and terminates below pad member 126. Filter web W traverses a path extending along the rear face of the angle section vertical leg, and between and in sandwiched engagement with the confronting faces of hold-down leg 132 and base plate 120, and hold-down leg 132 and pad member 126, whereby to maintain the web W at all times in position suitable for advancing and handling.

A channel shaped web engaging member 133 is swingably carried by slide base member 120, and comprises a cross web 134 provided with rearwardly directed longitudinal flanges 136 abutting the inner faces of base member flanges 121, and pivotally connected to the upper forward corners thereof by a transversely extending rod 137 registering with aligned openings formed in the flanges. Spaced below the lower corners of cross web 134 and suitably secured thereto (FIGURES 3 to 6) are a pair of transversely spaced web grip elements 138 terminating in rearwardly located arms 139 covered with caps 140 formed of a resilient friction material such as rubber. A bracket 141 is secured to and extends across the front face of web 134 between the upper and lower ends thereof, and is provided with an outwardly forwardly projecting end arm 142 terminating in outwardly directed ears 143. A pair of tension springs 144 are connected between ears 143 and slide bracket lugs 122, normally to urge the clamp member 133 resiliently to its tape clamping position and web grip elements 138 toward engagement with the lower border of the slide base plate 120.

The mechanism for reciprocating indexing slide 119 between its advanced and retracted position comprises a lever 146 having rearwardly and forwardly offset legs 147 and 148 respectively, and pivoted between its ends to a stationary horizontal post 149 disposed along the side of mounting plate 116. Arm 147 extends between plates 116 and 120 and terminates in a forked end which engages a rearwardly directed pin 150 mounted along the far edge of slide base plate 120. The free end of lever arm 148 is connected by a vertical link 151 to one end of a rocker arm 152 (FIGURES 1 and 11) pivoted between its ends to a horizontal support post 153 projection from wall 22. The opposite end of rocker arm 152 carries a cam follower 154 which engages cam C2, and is urged into engagement therewith by the weight of index slide 119 transmitted by way of lever 146, link 151 and rocker arm 152. Cam C2 is provided with a raised and depressed section and is so shaped and angularly related to cam C6 that the raised section of the cam C2 engages follower 154 between the time the cam follower 61 engages cam section 3C6 and 4C6, that is during the coffee brewing period, and the depressed section of cam C2 engages follower 154 from the time follower 61 engages cam section 1C6 until it engages about the mid-point of cam section 2C6.

Figure 3:
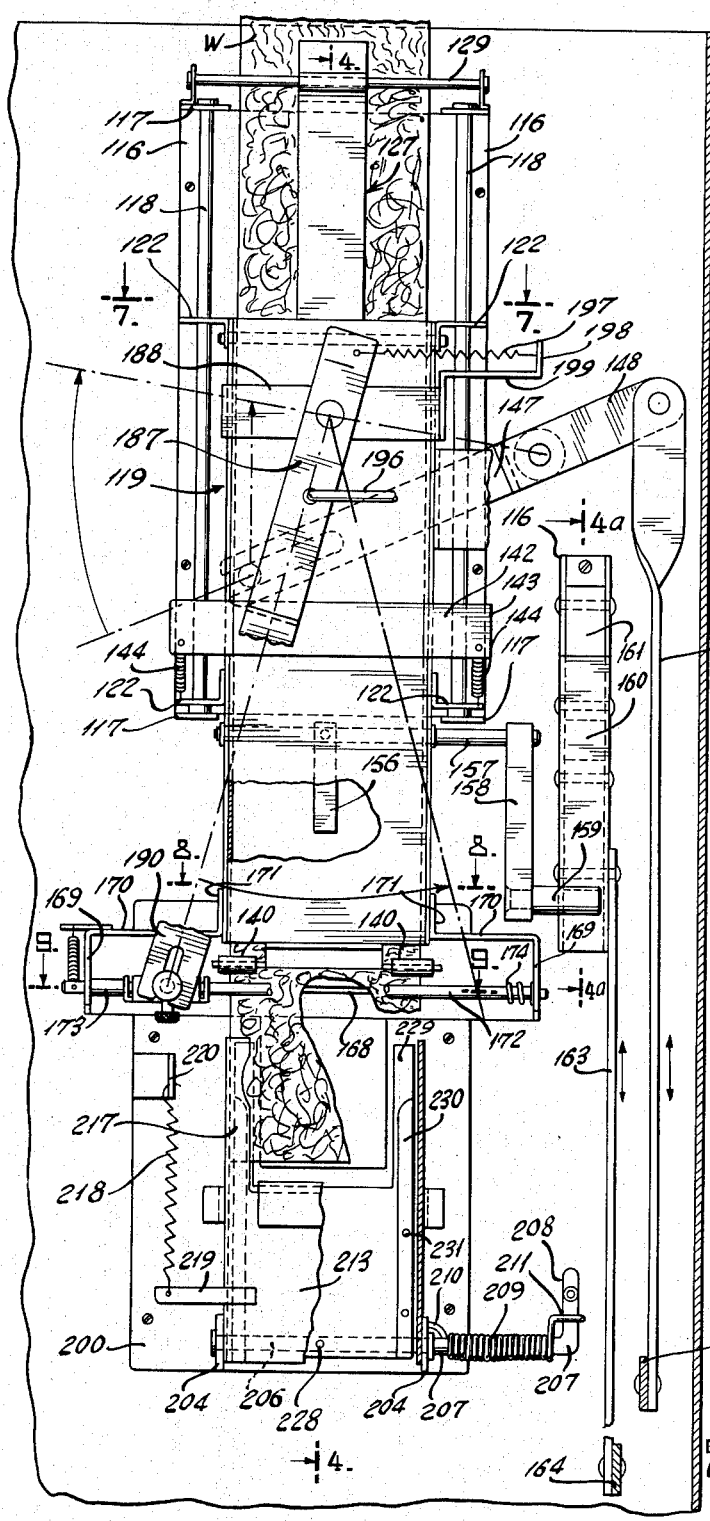
FIGURE 3 is a sectional view taken along line 3—3 in FIGURE 2, parts being shown partially broken away.

The web clamping plate 133 is rocked between a web engage and a web disengage position by a swingable arm 156 depending from and affixed to a crank shaft 157 journalled between slide flanges 121 (FIGURES 3 and 4). Shaft 157 projects beyond flange 121 and carries a depending radial arm 158 provided with an outwardly directed eccentric pin 159. Pin 159 is urged into sliding engagement with the front face of a vertical channel shaped bar 160 which is mounted along the vertical path thereof to wall 116 by a parallelogram linkage which permits the transverse movement of bar 160 while maintaining a vertical orientation. Specifically, channel bar 160 is connected by a pair of vertically spaced, parallel, rearwardly directed links 161 to a bracket 162 mounted on wall 116, links 161 being pivotally connected at their ends to bracket 162 and bar 160. Bar 160 and bracket 162 are formed of similarly shaped channels, and links 161 are likewise channel shaped.

Bar 160 is pivotally connected to the upper end of a vertical link 163, the lower end of which is connected to one end of a lever 164 pivoted between its ends to a horizontal post 165 mounted on wall 22. Lever 164 carries a cam follower 166 which bears against the under edge of cam C3. Cam C3 is so shaped and angularly oriented that its raised section engages follower 166 only during the upward movement of indexing slide 119 whereby, during this upward movement, web clamping elements 138 are in their retracted web disengage position as affected by arm 156 by way of lever 164, link 163, bar 160 and crank pin 159.

In order to cut a filter element F from web W, there is provided a transverse bed plate 167 secured to the rear face of slide plate 120 and depending below the lower edge of plate 120 and extending beyond the side edges thereof. Plate 167 has formed therein a longitudinally extending slot 168 immediately below the lower edge of slide plate 120 and extending substantially beyond the edges of the slide plate.

A pair of parallel plate brackets 169 project forwardly from the side edges of bed plate 167 and are reinforced by top plates 170 secured to the upper edges of bed plate 167 and plate bracket 169, and to the slide plate flanges 121 by upright ears 171. Supported by and between brackets 169 adjacent their forward edges and at the level of slot 168 is a guide rod 172 carrying at its left end as viewed in FIGURE 3 a stop member defining sleeve 173, and at its right end a bumper-defining helical spring 174.

Slidably carried by guide rod 172 is a carriage 176 including a rectangular base plate 177 provided with upright parallel ears 178 along its forward side edges, ears 178 having circular apertures formed therein registering with guide rod 172. A lug 179 is directed upwardly from the leading edge of base plate 177 and carries a headed pivot pin 180. Mounted on the top face of base plate 177, along its rear edge, is a blade support block 181 having a rectangular transverse recess formed along its rear upper edge which, in turn, has a clamp bar 182 registering therewith. A headed lock screw 183 has a threaded shank registering with aligned openings formed in plate 177 and block 181 and engages a tapped bore formed in clamp bar 182 to permit tightening thereof. A cutting blade 184 has a trailing section releasably clamped between block 181 and bar 182, and a forwardly directed angled cutting edge 186 projecting through and across bed plate slot 168 and forming an acute angle with the longitudinal axis thereof.

The cutter motivating mechanism includes a swingable vertical lever 187 pivoted at a point below its upper end to a cross bar 188 supported by side legs 189 secured to slide plate flanges 121. The lower section of lever 187 is forwardly offset, and terminates in a yoke 190 which straddles pin 180. A solenoid 191 (FIGURE 7) is mounted on bracket plate 192 supported by slide member 119 by means of a laterally projecting arm 193. Motivated by solenoid 191 is a retractable plunger or armature 194 which is connected by a rod 196 to lever 187 below the pivot point thereof. The upper end of lever 187 is connected by a tension spring 197 to a lug 198 carried by an arm 199 projecting laterally from bracket leg 189 to urge lever 187 clockwise, as viewed in FIGURE 3 of the drawing, and to transport carriage 176 and blade 184 to its retracted position. Upon energization of solenoid 191, armature 194 is retracted to swing lever 187 counterclockwise and rapidly move the carriage carried blade 184 along slot 168 to its advanced position, and upon deenergization of solenoid 191 spring 197 rapidly returns blade 184 to its retracted position by way of lever 187 and withdraws armature 194 from solenoid 191. Spring bumper 174 absorbs the shock of the advancing carriage at the terminus of its advance stroke.

The filter transfer mechanism 14 (FIGURES 3 to 6) is mounted on a suitably supported backing or base plate 200 which is coplanar with and disposed below base plate 116. Affixed to base plate 200, and located directly below the upper edge thereof, is a medially disposed forwardly, downwardly inclined guide ramp 201 having a vertical upper flange 202 abutting base plate 200 and a horizontal arm 203 directed rearwardly from the guide ramp lower edge to base plate 200. A pair of laterally spaced parallel bracket arms 204 projects forwardly from base plate 200 adjacent its bottom edge and there is journalled thereto a horizontal shaft 206 provided with a section 207 projecting beyond a bracket arm 204 and terminating in a radially projecting arm 208. Registering with the shaft section 207 is a helical torsion spring 209 having a leg 210 bearing against a bracket arm 204 and an opposite leg 211 bearing on the radial arm 208 resiliently to urge arm 208 and shaft 206 counterclockwise, as viewed in FIGURES 5 and 6 of the drawing.

A swingable transfer member 212 is freely rotatable on shaft 206, and comprises an upwardly directed lower cross plate 213 provided with rearward projecting flanges 214 extending along and above the side edges of cross plate 213. Said flanges 214 have parallel rear edges 215 diverging upwardly and terminating in upper edges 216 parallel to plate 213. Coplanar with plate 213 and projecting upwardly from the side borders thereof are parallel clamp arms 217 which join the front upper edges of flanges 214. A pair of aligned openings are formed in the front lower corners of flanges 214 and rotatably register with shaft 206. A helical tension spring 218 is connected between a laterally projecting arm 219 mounted on transfer member plate 213 and a forward projecting leg 220 on base plate 200 resiliently to urge transfer member 121 counterclockwise to its upright position, as seen in FIGURE 6 of the drawing, with flange edges 216 abutting base plate 200. Projecting rearwardly from the top edge of cross plate 213 is a filter stop lip 221 having a rearwardly directed downwardly inclined section 222 and terminating along its front edge in a depending flange abutting and secured to the front face of cross plate 213.

A clamp member 224 (FIGURES 3, 6 and 9) nests in transfer member 213 and is attached to and rotatable with shaft 206. The clamp member 224 includes a pair of upwardly directed laterally spaced arms 226 parallel to and closely confronting the inner faces of flanges 214 and joined at the lower front edges by a cross plate 227 whose upper edge is below stop lip 221 and whose lower border is fastened to shaft 206 by a pin 228. Directed inwardly from arms 226 above cross plate 227 are parallel clamp arms 229 which are coplanar with plate 227 and extend substantially to the tops of arms 226. A pair of spring fingers 230 in the form of elongated strips of resilient spring material is affixed to the side borders of the front face of cross plate 227 by welds 231 engaging the lower sections of fingers 230. The upper sections of fingers 230 are normally forwardly arcuately sprung and terminate at a point below the tops of arms 229. When clamp member 224 is in its spring retracted position, as seen in FIGURE 4, the upper rear edges of side arms 226 which upwardly converge with the side arms 226, abut base plate 200 so that clamp member 224 is rearwardly upwardly inclined in its retracted position. In such retracted position, clamp arms 229 and 217 are out of engagement and spring fingers 230 are in their spread relaxed positions. It should be noted, as best seen in FIGURES 19, 24 and 25, that the inner edges of clamp arms 229 and 217 have confronting arcuate recesses 232 formed therein to permit clearance of brew head 89, and the leading edge of the slide plate 80 is longitudinally slotted to permit the clearance of clamp arms 229 and 217 when the latter are swung from their advanced position as illustrated in FIGURE 16.

Transfer member 212 is motivated by cam C4 which is engaged by a cam follower 233 carried by a rocker arm 234 between the ends thereof. The lower end of rocker arm 234 (FIGUE 1) is pivoted to post 104 and the upper end thereof carries a turnbuckle type coupling member 236 which is connected by way of a tension spring 237 to the free end of the shaft-carried radial arm 208. Thus, the tension of spring 237 may be adjusted by turnbuckle coupler 236. The shape and angular orientation of cam C4 are such that follower 233 engages the raised portion of cam C4 to swing the transfer member to its advanced position, from a point during which cam section 2C6 is follower-engaged and brew head slide 80 is in its retracted position to a point immediately following the raising of brew receptacle B to its uppermost position in engagement with the brew head, whereafter follower 233 is engaged by the recessed section of cam C4 to permit the spring retraction of transfer member 212.

The coffee grounds dispensing system 18 (FIGURES 1, 2 and 13) includes a coffee hopper 238 suitably supported over brew mechanism 16, and hinged to its bottom wall is a funnel member 239 which is swingable between an upright advance position with its spout in alignment with and directly above the raised brew receptacle B and an inclined retracted position. Funnel member 239 is motivated by a solenoid 240, which, when energized, actuates a push rod 241 connected to funnel 239 below its near hinged top. Also associated with the coffee hopper 238 is coffee ground dispensing motor 242 which discharges a measured quantity of coffee grounds into funnel 239.

The water heating and metering arrangement 19 (FIGURES 26–29) comprises a tank assembly 243 insulated on its four sides and bottom and uninsulated at its top and including an inner shell 244 nesting in an outer shell 246, and separated therefrom by a filler 247 of suitable heat insulating material, the upper edges of the outer shell 246 being provided with a peripheral rim 248. Resting atop the shell 244 is an uninsulated metal closure lid 249 which serves the additional purpose of condensing steam which evolves from the water A disposed in tank 243. An electric resistance heater element 250 of the clad type rests on the bottom of inner shell 244 and is provided with electrical leads extending through the tank walls. A water feed pipe 251 communicates with the interior of tank 243 by way of an opening in lid 249, and is connected to a source of water by means of a normally closed valve 252 actuated by a solenoid 253.

Mounted on lid 249 by means of a bracket 254 and disposed above the level of the lid is a normally closed switch 256 provided on its underface with an actuating arm 257, the raising of which effects the opening of switch 256. A float member 258 is located in tank 243 and is raised and lowered in accordance with the level of the water A. The float 258 carries an upright actuating rod 259 which projects through a bushing 260 in lid 249 and when in raised position bears against switch arm 257 to actuate switch 256. Switch 256 is so located that it is actuated to its open position when the level of the water A reaches a height which allows for a vapor space 261 between lid 249 and the top level of water W.

A small housing 263 is supported atop the side wall of the tank outer shell 246, and encloses a metal steam tube 264 having an open outlet disposed outside housing 263 and an inlet connected to the vapor zone 261 by way of a hose 265 and a tube 266 projecting through the wall of tank 243. A metal plate 267 is affixed, in good heat transfer relation, to metal tube 264 and carries a double throw bimetal thermostatic switch 268. In housing 263, the space between steam tube 264 and outer jacket 246 is filled with a heat insulating filler 269. The space in front of the thermostat is clear, permitting the passage of air.

As seen in FIGURE 31 of the drawing, thermostatic switch 268 includes a bimetal arm 270 carrying contacts 271 at its lower end which alternately engage contact elements 272 or 273, the element 273 being engaged when the bimetal arm 270 is above a predetermined temperature about or slightly less than that of boiling water and the contact 272 being engaged at a somewhat lower temperature. Contact element 272 is connected to one terminal of resistance heater 250, the other terminal of which is connected to a first pole 274 of a source of electric current, the other pole being connected to switch arm 270. Contact element 273 is also connected to the current source first pole 274 by way of series connected switch 256 and water supply valve actuating solenoid 253.

By reason of the above water heating arrangement, a supply of hot water at a substantially constant temperature is always available substantially independent of the rate of discharge. In the event that the temperature of the water A is somewhat below the boiling point thereof, the power circuit to heater 250 is completed to energize the heater since the bimetal arm has cooled sufficiently to effect its engagement with contact element 272. Concurrently, contact element 273 is disengaged thereby to prevent the delivery of water to tank 243 since the valve solenoid cannot be energized. Upon water A being heated to its boiling point, bimetal arm 270 is heated by the steam condensing in or passing through tube 264 to switch said arm 270 out of engagement with contact element 272, deenergizing heater 250, and into contact with contact element 273. In the event that the level of the water A is low, switch 256 is permitted to close by lowered float 258, and the valve solenoid energized to open valve 252 until sufficient water is introduced into the tank to raise the level thereof and consequently float 258 to a position opening switch 256 and deenergizing 253 to close valve 252. It is apparent that since cold feed water can be delivered to tank 243 only when the water therein is at about its boiling point there is a very narrow range in fluctuation of the water temperature.

The brew water metering system includes a water metering vessel 276 located in tank 243 a short distance above the bottom thereof and having a downwardly directed inlet port 277 formed in its bottom wall and provided with a depending peripheral lip 278. The metering vessel 276 is supported by a vertical tube 279 whose lower end enters vessel 276 through and in liquid tight relationship with an opening formed in the vessel top wall 280, and is affixed to wall 280. Tube 279 depends from a flat topped cap 281 overlying and closing an opening 282 formed in tank lid 249, and is affixed to the cap and registers with an opening therein. Mounted atop cap 281 and communicating with tube 279 is a hollow cylindrical coupling member 283 having a laterally upwardly extending connecting tube 264 communicating, by way of a three way valve 286, alternately to a source of compressed air or to the atmosphere. Valve 286 normally connects tube 279 to the atmosphere by way of coupling member 283 and tube 284 and is actuated by a solenoid 287, the energization of which effects the connection of tube 279 to the source of compressed air.

A vertical outlet tube 288 slidably projects into vessel 276 through top wall 280 by way of a water tight bushing 289, the lower end of the tube 288 being externally threaded as at 290 and engaging a tapped collar 291 carried by a bracket 292 secured to and extending across the vessel 276 substantially at its midpoint. The level of the bottom of outlet tube 290 is below that of inlet tube 279, and is vertically adjustable by rotating the outlet tube 290 thereby to vary the unit quantity of metered water. The upper section of outlet tube 288 passes through and slidably and rotatably registers with a bushing 294 mounted on cap 281. Outlet tube 288 is connected by way of flexible hose 50 to hollow shaft 44 of brew receptacle B.

Associated with vessel inlet port 277 is a closure valve member 296 of cylindrical configuration provided with a rubber ring 297 which engages a peripheral groove formed in member 296. Valve member 296 is mounted on the lower end of a valve stem or rod 298, and is movable thereby between a lower port closing position, as illustrated in FIGURE 28, and a raised port open position, as illustrated in FIGURE 26. Valve rod 298 is of smaller diameter than the inner diameter of tube 279, and extends coaxially through tube 279 and slidably projects through a sleeve 299 mounted atop coupling member 283. An annular stop member 300 is affixed to the upper part of valve rod 298, and a helical compression spring 301 is entrapped between the stop member 300 and sleeve 299 normally to urge valve rod 298 to its raised position and valve member 296 to its open position.

The valve rod actuating mechanism (FIGURES 1, 2, 11 and 26) includes a lever 302 pivoted between its ends to an upright bracket 303' mounted on cap 281. One end of lever 302 bears upon the upper end of valve rod 298, and the opposite end of lever 302 bears against an underlying rod 303. This rod 303 is supported by and between the leading upper corners of a pair of parallel bracket plates 304, the trailing edges of which are connected by a cross plate 306. The upper trailing corners of bracket plates 304 have aligned openings formed therein which rotatably register with support rod 21, and a tension spring 307 extends from an upper stationary lug 308 to a cross bar carried by plates 304 to urge them resiliently to a raised position. A cross rod 309 is carried by and between the lower trailing corners of plates 304 and is connected by a rod 311 to the bottom leg 107 of rocker lever 103. Thus, the swinging of lever 103 by cam C5 to advance the brew head slide plate 80 effects the the retraction of connecting rod 311 to swing arms 304 upwardly and rock lever 303 clockwise, to depress valve rod 298 and close port 277 with valve member 296. When lever 103 retracts brew head slide plate 80, rod 298 is permitted to be raised by spring 301 thereby to open port 277.

In order to separate the compressed air from the coffee brew and release the pressure of the compressed air on the discharged coffee brew, brewer outlet hose 98 is connected through a downwardly forwardly inclined pipe 312 (FIGURE 29) into the upper section of a closed top cylindrical chamber 313 having a funnel shaped base 314 terminating in a depending liquid outlet pipe 316. An air outlet pipe 317 effects communication between the top of chamber 313 and the atmosphere. Chamber 313 is located in the upper part of the apparatus, and is connected to the coffee discharge spout by a flexible hose 318 engaging funnel pipe 316.

As illustrated in FIGURES 1, 11 and 30, the brew cycle control mechanism includes a single cycle timing device 320, diagrammatically shown, which is provided with a series of normally open switches S2, S3, S4 and S5 which are successively closed in timed sequences for predetermined periods in the known manner as will be hereinafter set forth. The timer switch assembly 320 is of conventional construction and may include switch control elements associated with each of the switches S2, S3, S4 and S5 and actuated in adjustable timed sequence by a timing motor in the well known fashion and according to the cycle hereinafter set forth. Timer 320 is motivated for a single cycle by the usual coin actuated mechanism. Also provided is a double throw switch S6 including an arm AS6 and poles 1S6 and 2S6 respectively. A lever 321, pivoted between its ends to a post 322, carries a cam follower 323 at one end thereof which engages cam C1 and is suitably coupled at its other end to switch arm AS6. Cam C1 rotates counterclockwise, as viewed in FIGURE 30, and has two recesses 1C1 and 2C1 spaced approximately as illustrated, switch arm AS6 engaging contact 1S6 when follower 323 registers with the raised portion of cam C1 and contact 2S6 when the follower registers with depressed section 1C1 or 2C1.

Electrical conductor lines 324 and 326 are connected to opposite poles of a suitable source of current. The brew motor 28 is connected between line 326 and switch arm AS6, switch contact 1S6 being directly connected to line 324, and switch contact 2S6 being connected in series with switch S2 to line 324, and likewise in series with switch S5 to line 324. The knife actuating solenoid 191, hopper motor 242 and hopper spout solenoid 240 are connected in parallel, and through switch S3 between lines 324 and 326. Switches S4 and S1 the air valve solenoid 287 are also series connected between lines 324 and 326. It should be noted that the closing intervals of switches S2, S3 and S5 are relatively short and that of switch S4 relatively long, corresponding to the time required for brew water under air pressure to pass through the brew receptacle and completely into the air separator. Furthermore, the closing of switch S4 coincides with the registry of follower 323 with cam section 2C1 and the registry of follower 61 with cam section 3C6, that is, when the brew receptacle is in its fully raised position in tight engagement with the brew head.

Considering now the operation of the apparatus described above, in its rest or dormant position the circuit network is as illustrated in FIGURE 30; follower 323 registering with cam recess 1C1 to open the brew motor circut; indexing slide member 119 is in its lowermost depressed position from which depends a length of filter web W along the ramp 201 to clamp arms 217; knife 184 and funnel 239 are in their retracted positions; and, as seen in FIGURE 12, brew receptacle B is in its inverted fully retracted position and the brew head carrying slide 80 is in its retracted position, follower 61 registering with cam section 1C6. Upon initiation of the brew cycle by the energization of timer 320, switch S2 is first momentarily closed to energize brew motor 28 which rotates the cam shafts and the cams carried thereby including cam C1 which swings switch arm AS6 into engagement with contact 1S6 continuing the energization of brew motor 28, whereafter switch S2 is opened.

Cam section 2C6 is carried into registry with the follower 61 to swing yoke 56 and brew receptacle B to their intermediate raised positions (FIGURE 13). During the upswing of yoke 56, shaft 44 is raised thereby and is rotated by pinion gear 49 sliding along rack 70 to rotate the shaft and brew receptacle B to its upright position in engagement with stop rod 65. Immediately thereafter, switch S3 is closed for a short interval to energize solenoid 191, which effects the rapid advance of knife blade 184 by way of the coupling linkage to sever a filter element F from web W and to energize spout solenoid 240 and motor 242, whereby to swing spout 239 into alignment with receptacle B and deposit a metered quantity of coffee grounds therein. Switch S3 is then opened to retract knife blade 184 and spout 239 to deenergize motor 242. Immediately thereafter, cam C4 effects the rotation of shaft 206 to swing clamp arms 229 and fingers 230 toward clamp arms 217, thereby to engage the side borders of filter element F (FIGURE 5), and the filter carrying transfer assembly is further swung to support filter element F in a forwardly downwardly inclined position directly overlying brew receptacle B (FIGURE 14). The brew head slide 80 is then advanced by cam C5 and the associated linkage to a position in which brew head 89 is above filter element F and in alignment with brew receptacle B (FIGURE 15), the abutment member 101 simultaneously engaging switch arm 102 to close switch S1 and permit the opening of compressed air valve 286, when switch S4 is actuated.

Cam section 3C6 is then brought into registry with the follower (FIGURE 16) to raise the brew receptacle B to its fully advanced position, pins 54 piercing and engaging the corners of the filter element F. The filter element being tightly engaged between the upper edge of brew receptacle B and gasket 96 and bearing against the underface of the perforate reinforcing plate 94, a liquid tight seal is effected between brew receptacle B and brew head 89. The filter transfer member is then released by cam C4 and is spring returned to its retracted position, leaving filter element F in its operative position between the brew receptacle B and brew head 89.

While cam section 3C6 engages follower 61, cam recess 2C1 is brought into registry with follower 323 to open contact 1S6 and deenergize and stop brew motor 28 and the advance of the cams. Prior thereto, however, and simultaneous with the advance of brew head slide 80, cam C5 and the associated linkage swing lever 302 to depress rod 298 and close port 277 with valve member 296, vessel 276 having been previously filled with water through the open port 277. Switch S4 is then closed by timer 320 which, by way of closed switch S1, energizes solenoid 287 to switch valve 286 and introduces compressed air through pipe 279, which forces hot water in vessel 276 upwardly through pipe 288, through hollow shaft 44 by way of tube 50, through the coffee grounds in brew receptacle B, through filter F and brew head 89, and thence to the air separating chamber 313. The switch S4 is closed for the time sufficient to permit the compressed air to transport substantially all the hot water in vessel 276 above the lower end of the tube 288 to air separator and pressure release chamber 313. Since the water in vessel 276 below the bottom of tube 288 is not discharged through the tube, the unit amount of water metered may be adjusted by varying the lower level of tube 288 as earlier described. Any air entering the chamber 313 is separated from the coffee brew and escapes by way of pipe 317, whereas the coffee brew flows by gravity from the bottom of chamber 313 to the coffee discharge spout.

Following the brewing of the coffee, switch S4 is opened to deenergize solenoid 287 and switch valve 286 to connect tube 279 to the atmosphere. Switch S5 is then momentarily closed to energize brew motor 28 and rotate the cams, the raised portion of cam C1 engaging follower 323 to close switch contact 1S6 and continue the energization of brew motor 28. Cam section 4C6, engaging follower 61, permits the retraction of brew receptacle B to its intermediate upright position, rack 70 dropping therewith, receptacle B carrying filter F FIGURES 17 and 23). The brew head slide 80 is then retracted and follower 61 travels along the inclined slope of cam recess 1C1 during which cam plate 39 engages the follower 79 to lock lever 73 and rack 70 in an upper position. As a consequence, as the yoke 56 descends, carrying shaft 44 and brew receptacle B therewith, pinion gear 49 and shaft 44 are rotated by rack 70 swinging receptacle B to its inverted position. The stripper elements 66 are thus brought to bear against the underface of filter element F, straddling the corresponding pins 54 and separating the filter element F from the edge of receptacle B (FIGURE 21). Lock plate 39 simultaneously passes out of engagement with follower 79, and spring 77 snaps lever 73 and rack 70 downwardly, carrying the inverted receptacle B therewith to expel the spent coffee grounds and filter element from receptacle B to a suitable discharge container, thereby readying the brew assembly for the next cycle (FIGURES 12 and 22), at which time follower 61 rests in cam recess 1C6. It should be noted that the water passing upward through the grounds impacts them into a somewhat cohesive mass against the filter element to facilitate their complete ejection from the receptacle B substantially as a unit.

Following the severing of web W by knife blade 184, the web engaging member and the grip elements are retracted by cam C3 and the associated linkage (FIGURES 5 and 5a) to release web W, and the indexing slide is raised by cam C2 and associated linkage, web W, sandwiched between pad 126 and gravity biased clamp leg 132, remaining stationary. The indexing assembly remains in the above position during the brewing period, permitting web W to assume a flat unstressed condition. Following the brewing period, clamp member 133 and grip elements 138 are permitted by cam C3 and associated linkage to be spring urged to its advanced position with elements 138 engaging web W (FIGURES 6 and 6a), and index assembly 119 is lowered by cam C2 to withdraw a measured length of web from supply roll R and locate the leading end of the web W along ramp 201 between clamp arms 217 and 229 (FIGURE 4), thus readying the filter element forming and transfer mechanism for the start of another cycle. The brew motor 28 is deenergized and stopped when the follower 323 engages cam depression 1C1.

While there has been described and illustrated a preferred embodiment of the present invention, it is apparent that numerous alterations, omissions and additions may be made without departing from the spirit thereof.

What is claimed is:

1. A brewing apparatus comprising a brew receptacle having inlet and outlet openings, means for depositing a predetermined quantity of coffee grounds into said receptacle, means for withdrawing from a supply of filter material a separated, individual disposable filter element and applying said filter element to said outlet opening, means for releasably locking said filter element in registry with said outlet opening, means for feeding water into said inlet opening, through said coffee grounds in said receptacle and out through said outlet opening, and means for discharging said coffee grounds and said filter element from said brew receptacle.

2. A brewing apparatus comprising a brew receptacle having inlet and outlet openings, means for depositing a predetermined amount of coffee grounds into said receptacle, means for withdrawing from a supply of filter material a separated, individual disposable filter element and applying said filter element to said outlet opening, cap means relatively movable into engagement with said outlet opening for releasably locking said filter element in registry with said outlet opening and including an outlet conduit in communication with the interior of said cap, means for feeding water into said inlet opening through said coffee grounds in said receptacle and through said outlet opening and said outlet conduit, and means for discharging said coffee grounds and said filter element from said brew receptacle.

3. A brewing apparatus according to claim 2, including a perforated filter reinforcing member carried by said cap and registering with said filter element when said cap engages said outlet opening.

4. A brewing apparatus according to claim 2, wherein said water feeding means includes a water measuring receptacle, means for introducing water into said measuring receptacle, means connecting said receptacle to said brew receptacle inlet, and means selectively connecting said measuring receptacle to a source of compressed air to discharge the water therein through said brew receptacle inlet.

5. A brewing apparatus according to claim 4, and including an air separator connected to said outlet conduit.

6. A brewing apparatus according to claim 4, and including a hot water reservoir, said measuring receptacle being immersed in said hot water reservoir and having a water inlet port formed therein, a closure member, and means for moving said closure member into engagement with said water inlet port when said measuring receptacle is connected to said compressed air.

7. A brewing apparatus according to claim 2, wherein said brew receptacle is rotatable between an upright brew position with said outlet opening being upwardly directed and an inverted, grounds discharge position.

8. A brewing apparatus comprising a brew receptacle having inlet and outlet openings, means for depositing a predetermined amount of coffee grounds into said receptacle, means for withdrawing a predetermined length of filter material from a package thereof, means for severing said predetermined length of said filter material from said package to form a filter element, means for applying said filter element to said outlet opening, cap means relatively movable into engagement with said outlet opening for releasably locking said filter element in registry with said outlet opening and including an outlet conduit in communication with the interior of said cap, means for feeding water into said inlet opening through said coffee grounds in said receptacle and through said outlet opening and said outlet conduit, and means for discharging said coffee grounds and said filter element from said brew receptacle.

9. A brewing apparatus according to claim 8, wherein said filter element applying means includes a transfer member for transporting said filter element from said forming means into registry with said brew receptacle outlet opening.

10. A coffee brewing apparatus comprising an open topped brew receptacle having a water inlet port formed in the bottom thereof, means for rotating said brew receptacle between an upright brew position and an inverted grounds discharge position, means for depositing a predetermined quantity of coffee grounds into said upright brew receptacle, means for withdrawing from a supply of filter material a separate individual, disposable filter element and applying said filter element to said brew receptacle open top, a lid defining brew head relatively movable into and out of engagement wtih said brew receptacle open top for releasably locking said filter element in registry with said open top and including an outlet conduit registering with a port formed in said brew head, means for passing a predetermined quantity of water through said water inlet port and outlet conduit by way of said coffee grounds and said filter element, and means for inverting said brew receptacle and discharging said coffee grounds and said filter element therefrom.

11. A brewing apparatus comprising an open topped brew receptacle having a water inlet port communicating with the bottom thereof, means for supporting said brew receptacle for vertical movement between an upper advanced and a lower retracted position and for rotation between an upright brew position and an inverted discharge position, a lid defining brew head movable between an advanced position in axial alignment with said brew receptacle and a retracted position out of alignment therewith and having a liquid outlet port formed therein, means for depositing a predetermined quantity of coffee grounds in said brew receptacle when in an upright position, means for supporting a filter element between said brew head in its advanced position and said upright brew receptacle when below its advanced position, means for thereafter moving said brew receptacle to its advanced position to tightly engage said filter element between said brew head and said brew receptacle and means for thereafter passing a predetermined quantity of extraction water through said inlet port, coffee grounds and filter element and out of said water outlet port.

12. A brewing apparatus according to claim 11, wherein said filter element support means comprises a transfer member swingable between a retracted upright position and an advanced forwardly directed position and includes a pair of transversely spaced longitudinally extending first arms and second arms movable into engagement with said first arms and adapted to releasably support a filter element therebetween.

13. A brewing apparatus according to claim 12, and including a pair of pin elements mounted on and projecting above said brew receptacle and adapted to pierce said filter element.

14. A brewing apparatus according to claim 11, and wherein said brew receptacle is mounted on a hollow shaft rockable about its longitudinal axis and having an opening formed therein communicating with said inlet port, said extraction water passing through said hollow shaft.

15. A brewing apparatus according to claim 11, including a coffee grounds supporting perforated member disposed in said brew receptacle above said inlet port.

16. A brewing apparatus according to claim 11, including a filter reinforcing perforated member carried by and disposed below said brew head, said reinforcing member overying said filter member when said brew head is in its advanced brew receptacle engaging position.

17. A brewing apparatus comprising an open topped brew receptacle movable between an upper advanced position and a lower retracted position and rockable between an upright and an inverted position and having a water inlet port adjacent to its lower end, water feed means connected to said inlet port, a lid defining brew head carrying a brew outlet conduit and slidable between an advanced position in vertical alignment with said brew receptacle and a retracted position, a transfer member adapted to releasably support a filter element and movable between an advanced position between directly above said brew receptacle and a retracted position, dispensing means for depositing a predetermined quantity of coffee grounds in said brew receptacle, means for feeding a predetermined quantity of water through said brew receptacle inlet port, and motivating means for rotating said brew receptacle to an upright position and for advancing said brew receptacle to a position below said advanced position, for thereafter actuating said coffee dispensing means for thereafter advancing said filter element transfer member, for thereafter advancing said brew head, for thereafter raising said brew receptacle to its advanced position whereby to sandwich said filter element between said brew head and said brew receptacle, for thereafter actuating said water feed means, and for thereafter inverting and retracting said brew receptacle to dump said filter element and coffee grounds.

18. A brew apparatus according to claim 17, wherein said motivating means includes a vertically movable rotatable shaft carrying said brew receptacle, a pivoted lever engaging said shaft and movable therewith between a raised and a depressed position and cam means for said lever through a predetermined sequence.

19. A brew apparatus according to claim 18, wherein said motivating means includes a rack and pinion mounted on said shaft and engaging said rack.

20. A brew apparatus according to claim 19, wherein said rack is vertically movable and is spring urged to its lowermost position and including means releasably locking said rack in its upper position.

21. A brew apparatus according to claim 18, including a stripping member mounted on said lever and disposed below the edge of said brew receptacle when said brew receptacle is in its inverted position.

22. In a coffee brewing apparatus, a brewing receptacle supported for vertical movement and for rotation between an upright position and an inverted position, means for depositing coffee grounds into the upright receptacle, means for applying a filter element to the receptacle, and discharge means operatively connected to said receptacle for inverting said receptacle and moving said receptable rapidly downwardly to an abrupt stop to discharge said coffee grounds and said filter element therefrom and thereafter returning said receptacle to its raised upright position.

23. In a coffee brewing apparatus, a brew receptacle supported for vertical movement and for rotation between an upright position and inverted position, means for depositing coffee grounds into the upright brew receptacle, means for applying a filter element to the brew receptacle, and dicharge means for inverting said receptacle and moving said receptacle rapidly downwardly to an abrupt stop to discharge said coffee grounds and said filter element therefor and including spring means normally urging said receptacle downwardly and means for releasably locking said receptacle in an upper position and means for actuating said locking means to release said receptacle for movement to its lowermost position.

24. In a coffee brewing apparatus, a brew receptacle supported for vertical movement and for rotation between an upright position and an inverted position, means for depositing coffee grounds into the upright brew receptacle, means for applying a filter element to the brew receptacle, and discharge means for inverting said receptacle and moving said receptacle rapidly downwardly to an abrupt stop to discharge said coffee grounds and said filter element therefrom, and including a vertically movable horizontal shaft supporting said receptacle, a gear affixed to said shaft, a vertically movable rack engaging said gear, spring means urging said rack downwardly, means for releasably locking said rack in a raised position, means for depressing said shaft wereby to rotate said shaft and invert said receptacle, and means for actuating said locking means to release said rack for downward movement upon inversion of said receptacle.

25. A brewing apparatus comprising a brew member movable between a raised and lowered position and including an open topped brew receptacle rotatable between an upright and an inverted position, means for depositing an infusion material into said brew receptacle, means for circulating water through said infusion material in said brew receptacle, and means operatively connected to said brew member for rotating said brew receptacle from its upright to its inverted position and rapidly lowering said inverted brew receptacle and bringing said inverted brew receptacle to an abrupt stop to said lowering movement and thereafter returning said brew receptacle to its raised upright position.

26. A brewing apparatus comprising a brew member movable between a raised and lowered position and including an open topped brew receptacle rotatable between an upright and an inverted position, means for depositing an infusion material into said brew receptacle, means for circulating water through said infusion material in said brew receptacle, a stop member located in the path of said brew member adjacent its lowered position, means operatively connected to said brew member for rotating said brew receptacle from its upright to its inverted position and means for rapidly lowering said brew member with said receptacle in an inverted position into striking engagement with said stop member and thereafter returning said brew receptacle to its raised upright position.

27. A brewing apparatus comprising a brew member movable between a raised and lowered position and including an open topped brew receptacle rotatable between an upright and an inverted position, a liquid conduit communicating with said receptacle, means for depositing coffee grounds into said receptacle, means for passing a liquid through said conduit and said receptacle, a stop member located in the path of said brew member adjacent its lowered position, means operatively connected to said brew member for rotating said brew receptacle from its upright to its inverted position and means for rapidly lowering said brew member with said receptacle in an inverted position into striking engagement with said stop member, whereby to discharge said coffee grounds from said receptacle by reason of the momentum thereof and thereafter returning said brew receptacle to its raised upright position.

28. A brewing apparatus comprising a brew member movable between a raised and lowered position and including an open topped brew receptacle rotatable between an upright and an inverted position, a liquid conduit communicating with said receptacle, means for depositing coffee grounds into said receptacle, means for passing a liquid through said conduit and said coffee grounds in said receptacle, a stop member located in the path of said brew member adjacent its lowered position, spring means for urging said brew member to its lowered position in engagement with said stop member, means for releasably locking said brew member in its raised position with said receptacle in an upright position, means for rotating said brew receptacle from an upright to an inverted position, and means for releasing said brew member for movement into striking engagement with said stop member with said brew receptacle in an inverted position, whereby to discharge said coffee grounds from said receptacle by reason of the momentum thereof.

29. In a coffee brewing apparatus, a brew receptacle supported for vertical movement and for rotation between an upright position and an inverted position, means for depositing coffee grounds into the upright brew receptacle, and discharge means for inverting said receptacle and moving said receptacle rapidly downwardly to an abrupt stop to discharge said coffee grounds therefrom, and including spring means normally urging said receptacle downwardly and means for releasably locking said receptacle in an upper position and means for actuating said locking means to release said receptacle for movement to its lowermost position.

30. A brewing apparatus comprising a brew member movable between a raised and lowered position and including a brew receptacle having an open end, means for introducing an infusion material into said brew receptacle, means for passing a brewing fluid through said infusion material in said brew receptacle, and means for rapidly lowering said brew receptacle with said opening directed downwardly and bringing said brew receptacle to an abrupt stop to effect the discharge of said infusion material therefrom.

31. A brewing apparatus comprising a brew member movable between a raised and lowered position and including a brew receptacle having an open end, means for introducing an infusion material into said brew receptacle, means for passing a brewing fluid through said infusion material in said brew receptacle, a stop member located in the path of said brew member adjacent its lowered position, and means for rapidly lowering said brew member with said opening directed downwardly into striking engagement with said stop member to effect the discharge of said infusion material therefrom.

32. A brewing apparatus comprising a brew receptacle means for introducing an infusion material into said brew receptacle, means for passing a brewing liquid through said infusion material in said brew receptacle, and means for discharging said infusion material from said brew receptacle including means for moving a surface to which said infusion material adheres rapidly downwardly and bringing said surface to an abrupt stop to effect the separation of said infusion material therefrom.

33. A brewing apparatus comprising a brew chamber including a member defining a wall thereof, means for introducing an infusion material into said brew chamber, means for passing a brewing liquid through said infusion material in said brew chamber, and means for discharging said infusion material from said brew chamber including means for moving said wall member rapidly down and bringing said wall member to an abrupt stop to effect the separation of said infusion material therefrom.

34. A brewing apparatus comprising a brew chamber including a vertically movable member defining a wall thereof, means for introducing an infusion material into said brew chamber, means for passing a brewing liquid through said infusion material in said brew chamber, and means for discharging said infusion material from said brew chamber including means for moving said wall member rapidly downwardly and bringing said wall member to an abrupt stop to effect the separation of said infusion material therefrom.

35. The brewing apparatus of claim 34 wherein said wall member moving means includes spring means urging said wall member downwardly and comprising a stop member disposed in the downward path of said wall member.

References Cited by the Examiner

UNITED STATES PATENTS

| | | | |
|---|---|---|---|
| 228,795 | 6/1884 | Withey | 83—266 |
| 406,164 | 7/1889 | Focht | 294—73 |
| 1,067,101 | 7/1913 | Doble | 122—448 |
| 1,286,976 | 12/1918 | Farr | 222—72 |
| 1,336,605 | 4/1920 | Becker | 226—147 X |
| 1,434,888 | 11/1922 | Guardino | 83—266 |
| 2,128,964 | 9/1938 | Pityo | 226—149 |
| 2,209,995 | 8/1940 | Morris | 83—159 |
| 2,371,516 | 3/1945 | Griffiths | 236—33 |
| 2,392,452 | 1/1946 | Baumann | 99—289 |
| 2,720,868 | 10/1955 | Wollner | 122—448 |
| 2,831,684 | 4/1958 | Cundall | 83—161 X |
| 2,885,119 | 5/1959 | Carroll | 222—72 |
| 2,887,038 | 5/1959 | Rosander | 99—307 |
| 2,901,135 | 8/1959 | Stadelman | 214—308 |
| 2,910,928 | 11/1959 | Rota. | |
| 2,931,288 | 4/1960 | Totten | 99—289 |
| 3,026,684 | 3/1962 | Chace | 62—353 X |

WALTER A. SCHEEL, *Primary Examiner.*